(12) United States Patent
Baer et al.

(10) Patent No.: US 7,681,756 B2
(45) Date of Patent: Mar. 23, 2010

(54) STRETCHABLE COMPOSITE SHEET FOR ADDING SOFTNESS AND TEXTURE

(75) Inventors: David J. Baer, Oshkosh, WI (US); Kenneth B. Close, New London, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 782 days.

(21) Appl. No.: 11/131,595

(22) Filed: May 18, 2005

(65) Prior Publication Data

US 2005/0266759 A1    Dec. 1, 2005

Related U.S. Application Data

(63) Continuation of application No. 09/754,026, filed on Jan. 3, 2001, now abandoned.

(51) Int. Cl.
*B32B 3/00* (2006.01)
(52) U.S. Cl. .............................. 221/33; 221/47; 221/48; 221/63; 442/328; 442/329; 442/381; 442/156; 442/174; 442/181; 442/327; 442/98
(58) Field of Classification Search ................... 221/33, 221/34, 45
See application file for complete search history.

(56) References Cited

U.S. PATENT DOCUMENTS

| | | | |
|---|---|---|---|
| 2,957,512 A | 10/1960 | Wade | |
| 3,165,432 A | 1/1965 | Plaskett | |
| 3,316,136 A | 4/1967 | Pufahl | |
| 3,481,012 A | 12/1969 | Saxon | |
| 3,591,440 A | 7/1971 | Harstein | |
| 3,644,157 A | 2/1972 | Draper | |
| 3,676,242 A | 7/1972 | Prentice | |
| 3,687,797 A | 8/1972 | Wideman | |
| 3,692,618 A | 9/1972 | Dorschner et al. | |
| 3,780,908 A * | 12/1973 | Fitzpatrick et al. | ............ 221/48 |
| 3,849,241 A | 11/1974 | Butin et al. | |
| 3,898,788 A | 8/1975 | Fehrer | |
| 3,962,618 A | 6/1976 | Burton et al. | |
| 3,989,788 A | 11/1976 | Estes, Jr. et al. | |
| 4,100,324 A | 7/1978 | Anderson et al. | |
| 4,209,563 A | 6/1980 | Sisson | |
| 4,323,534 A | 4/1982 | DesMarais | |
| 4,329,315 A | 5/1982 | Brower et al. | |
| 4,333,782 A | 6/1982 | Pieniak | |
| 4,340,563 A | 7/1982 | Appel et al. | |
| 4,355,425 A | 10/1982 | Jones et al. | |

(Continued)

FOREIGN PATENT DOCUMENTS

DE    29705157    12/1997

(Continued)

*Primary Examiner*—Gene Crawford
*Assistant Examiner*—Michael K Collins
(74) *Attorney, Agent, or Firm*—Armstrong Teasdale, LLP

(57) ABSTRACT

A method for increasing the thickness of a fibrous sheet including stretching the sheet beyond its relaxed length and returning the sheet to about the relaxed length, causing the sheet to have a second thickness greater than the first thickness. The sheet can be a wet-wipe. The wet-wipe includes an elastic layer and a fibrous layer, which increases in thickness when stretched then relaxed. The wet-wipe can be stored in a container which causes the wet-wipe to stretch as it is removed from the container.

6 Claims, 17 Drawing Sheets

U.S. PATENT DOCUMENTS

| | | | |
|---|---|---|---|
| 4,418,123 A | | 11/1983 | Bunnelle et al. |
| 4,426,420 A | | 1/1984 | Likhyani |
| 4,436,780 A | | 3/1984 | Hotchkiss et al. |
| 4,469,243 A | * | 9/1984 | Ito et al. .................. 221/34 |
| 4,478,354 A | * | 10/1984 | Notheis .................. 221/34 |
| 4,543,099 A | | 9/1985 | Bunnelle et al. |
| 4,548,856 A | | 10/1985 | Ali Khan et al. |
| 4,555,811 A | | 12/1985 | Shimalla |
| 4,600,620 A | | 7/1986 | Lloyd et al. |
| 4,604,313 A | | 8/1986 | McFarland et al. |
| 4,605,366 A | | 8/1986 | Lehmann et al. |
| 4,606,964 A | | 8/1986 | Wideman |
| 4,640,726 A | | 2/1987 | Sallee et al. |
| 4,657,802 A | | 4/1987 | Morman |
| 4,663,106 A | | 5/1987 | Pomplun et al. |
| 4,663,220 A | | 5/1987 | Wisneski et al. |
| 4,692,368 A | * | 9/1987 | Taylor et al. .................. 428/137 |
| 4,720,415 A | | 1/1988 | Vander Wielen et al. |
| 4,741,941 A | | 5/1988 | Englebert et al. |
| 4,741,944 A | * | 5/1988 | Jackson et al. .................. 428/152 |
| 4,741,949 A | | 5/1988 | Morman et al. |
| 4,781,966 A | * | 11/1988 | Taylor .................. 428/152 |
| 4,786,353 A | | 11/1988 | Templeton et al. |
| 4,787,699 A | | 11/1988 | Moulin |
| 4,801,482 A | * | 1/1989 | Goggans et al. .................. 428/68 |
| 4,803,117 A | | 2/1989 | Daponte |
| 4,808,252 A | | 2/1989 | Lash |
| 4,849,049 A | | 7/1989 | Colton |
| 4,865,221 A | * | 9/1989 | Jackson et al. .................. 221/48 |
| 4,883,549 A | | 11/1989 | Frost et al. |
| 4,908,247 A | | 3/1990 | Baird et al. |
| 4,910,064 A | | 3/1990 | Sabee |
| 4,965,122 A | | 10/1990 | Morman |
| 4,996,091 A | | 2/1991 | McIntyre |
| 5,144,729 A | | 9/1992 | Austin et al. |
| 5,165,979 A | | 11/1992 | Watkins et al. |
| 5,180,620 A | | 1/1993 | Mende |
| 5,200,246 A | | 4/1993 | Sabee |
| 5,223,319 A | | 6/1993 | Cotton et al. |
| 5,232,533 A | | 8/1993 | Tani et al. |
| 5,324,800 A | | 6/1994 | Welborn, Jr. et al. |
| 5,350,624 A | | 9/1994 | Georger et al. |
| 5,376,198 A | | 12/1994 | Fahrenkrug et al. |
| 5,385,775 A | | 1/1995 | Wright |
| 5,415,925 A | | 5/1995 | Austin et al. |
| 5,455,110 A | | 10/1995 | Connor |
| 5,498,463 A | | 3/1996 | McDowall et al. |
| 5,501,679 A | | 3/1996 | Krueger et al. |
| 5,508,102 A | | 4/1996 | Georger et al. |
| 5,520,308 A | | 5/1996 | Berg, Jr. et al. |
| 5,540,332 A | * | 7/1996 | Kopacz et al. .................. 206/494 |
| 5,542,567 A | | 8/1996 | Julius |
| 5,560,974 A | | 10/1996 | Langley |
| 5,575,874 A | | 11/1996 | Griesbach, III et al. |
| 5,616,408 A | | 4/1997 | Oleszczuk et al. |
| 5,618,610 A | | 4/1997 | Tomita et al. |
| 5,678,321 A | | 10/1997 | Deshpande et al. |
| 5,691,034 A | | 11/1997 | Kruegger et al. |
| 5,766,737 A | | 6/1998 | Willey et al. |
| 5,785,179 A | | 7/1998 | Buczwinski et al. |
| 5,789,065 A | | 8/1998 | Haffner et al. |
| 5,834,385 A | | 11/1998 | Blaney |
| 5,910,224 A | | 6/1999 | Morman |
| 5,910,225 A | | 6/1999 | McAmish et al. |
| 5,962,112 A | | 10/1999 | Haynes et al. |
| 6,028,018 A | | 2/2000 | Amundson et al. |
| 6,039,906 A | | 3/2000 | Sageser et al. |
| 6,054,202 A | | 4/2000 | Takeuchi et al. |
| 6,171,682 B1 | | 1/2001 | Raidel et al. |
| 6,412,656 B1 | * | 7/2002 | Placik .................. 221/33 |
| 6,429,261 B1 | | 8/2002 | Lang et al. |
| 6,610,173 B1 | | 8/2003 | Lindsay et al. |
| 6,808,791 B2 | | 10/2004 | Curro et al. |
| 6,811,638 B2 | | 11/2004 | Close et al. |
| 6,946,413 B2 | * | 9/2005 | Lange et al. .................. 442/327 |
| 2001/0009711 A1 | | 7/2001 | Latimer et al. |
| 2002/0127937 A1 | | 9/2002 | Lange et al. |

FOREIGN PATENT DOCUMENTS

| | | |
|---|---|---|
| EP | 0006647 | 7/1983 |
| EP | 0096546 | 5/1987 |
| EP | 0130764 | 1/1988 |
| EP | 0302382 | 2/1989 |
| EP | 0343304 A2 | 11/1989 |
| EP | 0415758 | 3/1991 |
| EP | 0456044 | 11/1991 |
| EP | 0286538 | 1/1992 |
| EP | 0371802 | 11/1992 |
| EP | 0371804 | 3/1993 |
| EP | 0218473 | 7/1993 |
| EP | 0291211 | 7/1993 |
| EP | 0410937 | 12/1993 |
| EP | 0575123 | 12/1993 |
| EP | 0605831 | 7/1994 |
| EP | 0343978 | 11/1994 |
| EP | 0500590 | 7/1995 |
| EP | 0606234 | 10/1995 |
| EP | 0606235 | 10/1995 |
| EP | 0606242 | 12/1995 |
| EP | 0544156 | 6/1996 |
| EP | 0699163 | 1/1997 |
| EP | 0713546 | 3/1997 |
| EP | 0715661 | 10/1997 |
| EP | 0644130 | 5/1998 |
| EP | 0714254 | 5/1998 |
| EP | 0747313 | 5/1998 |
| EP | 0857453 | 8/1998 |
| EP | 0865755 A1 | 9/1998 |
| EP | 0546837 | 11/1998 |
| EP | 0875609 | 11/1998 |
| EP | 0879575 | 11/1998 |
| EP | 0714351 | 12/1998 |
| EP | 0712304 | 4/1999 |
| EP | 0955247 | 11/1999 |
| EP | 0955260 | 11/1999 |
| EP | 0970909 | 1/2000 |
| EP | 0978247 | 2/2000 |
| EP | 0980841 | 2/2000 |
| EP | 0983739 | 3/2000 |
| EP | 0983740 | 3/2000 |
| EP | 0670385 | 4/2000 |
| EP | 0748748 | 5/2000 |
| EP | 1000577 | 5/2000 |
| EP | 1002746 | 5/2000 |
| EP | 1044894 | 10/2000 |
| EP | 1090868 | 4/2001 |
| EP | 986322 | 12/2001 |
| GB | 2106862 | 4/1983 |
| GB | 2130965 | 6/1984 |
| GB | 2130965 A | 6/1984 |
| GB | 2106862 B | 4/1985 |
| WO | WO-93/15248 | 8/1993 |
| WO | WO-94/12699 | 6/1994 |
| WO | WO-94/28219 | 12/1994 |
| WO | WO-95/03171 | 2/1995 |
| WO | WO-96/00625 A2 | 1/1996 |
| WO | WO-96/16216 | 5/1996 |
| WO | WO-96/21475 | 7/1996 |
| WO | WO-96/26664 | 9/1996 |
| WO | WO-97/02130 | 1/1997 |
| WO | WO-97/23677 | 7/1997 |
| WO | WO-97/43938 | 11/1997 |
| WO | WO-98/03713 | 1/1998 |

| | | | | | | |
|---|---|---|---|---|---|---|
| WO | WO-98/06640 | 2/1998 | | WO | WO-00/38911 | 7/2000 |
| WO | WO-98/16678 | 4/1998 | | WO | WO-00/38912 | 7/2000 |
| WO | WO-98/23519 | 6/1998 | | WO | WO-00/38913 | 7/2000 |
| WO | WO-98/29018 | 7/1998 | | WO | WO-0038565 A1 | 7/2000 |
| WO | WO-98/52453 | 11/1998 | | WO | WO-00/48834 | 8/2000 |
| WO | WO-98/52454 | 11/1998 | | WO | WO-01/00917 | 1/2001 |
| WO | WO-99/24551 | 5/1999 | | | | |
| WO | WO-00/38565 | 7/2000 | | | | |

* cited by examiner

STRETCHABLE COMPOSITE SHEET FOR ADDING SOFTNESS AND TEXTURE

RELATED APPLICATION

This application is a continuation under 37 C.F.R. 1.53(b) of U.S. patent application Ser. No. 09/754,026 filed Jan. 3, 2001, now abandoned which application is incorporated by reference and made a part hereof.

BACKGROUND OF THE INVENTION

Fibrous materials and fibrous composite materials are widely used as products, or as components of products, such as wet-wipes because they can be manufactured inexpensively and made to have specific characteristics. These products can be manufactured so inexpensively that they can be viewed as disposable, as opposed to reusable.

One approach to making fibrous composite materials for wet-wipes the use of homogeneous mixtures of materials such as air laid, non-woven webs of fibers mixed with cellulosic fibers or another absorbent material. Other wet-wipes have been prepared by joining different types of non-woven materials in a laminate or formed as a layered structure. These products can be prepared from plastic materials such as plastic sheets, films and non-woven webs, prepared by extrusion processes such as, for example, slot film extrusion, blown bubble film extrusion, meltblowing of non-woven webs and spinbonding.

The materials that are useful for consumer products should meet minimum product standards for strength, moisture level, size, flexibility, thickness, softness and texture. However, if one of these parameters is changed this can affect another of the parameters. Thus, a goal for these laminates is to produce a product that can mimic a soft cloth-like feel or at least get closer to a soft cloth-like feel than has been previously possible while still maintaining acceptable strength.

Such a soft cloth-like feel is often characterized by, among other things, one or more of the following: thickness, bulk density, flexibility, texture, softness, density, and durability of the non-woven materials. These materials are suitable for disposable products such as, for example, disposable diapers, disposable tissues and disposable wipes, for example, disposable wet-wipes.

Unfortunately, manufacturing and distribution processes reduce the thickness of wet-wipes. This reduces the softness and cloth-like feel, which is desired by the consumer. Accordingly, there is a need to improve the softness and cloth-like texture of a wet-wipe, for example by increasing the thickness prior to use.

DEFINITIONS

For the purposes of the present application, the following terms shall have the following meanings:

The term "elastic", as used herein, means any material which, upon application of a biasing force, is stretchable, that is, elongatable at least about 5 to about 30 percent (i.e., to a stretched, biased length which is at least about 105 to about 130 percent of its relaxed unbiased length), and which, will recover at least 55 percent of its elongation upon release of the stretching, elongating force. A hypothetical example would be a one (1) cm sample of a material which is elongatable to at least 1.30 cm and which, upon being elongated to 1.30 cm and released, will recover to a length of not more than 1.135 cm. Many elastic materials can be elongated by much more than 30 percent (i.e., much more than 130 percent of their relaxed length), for example, elongated 60 percent, 100 percent or more, and many of these will recover to substantially their initial relaxed length, for example, to within 105 percent of their original relaxed length, upon release of the stretching force.

As used herein, the term "non-elastic" means any material which does not fall within the definition of "elastic," above.

As used herein, the term "non-woven web" means a structure or a web of material which has been formed without use of weaving processes to produce a structure of individual fibers or threads which are intermeshed or interlaid, but not in an identifiable, repeating manner. Non-woven webs have been, in the past, formed by a variety of conventional processes such as, for example, meltblowing processes, spinbonding processes, film aperturing processes and staple fiber carding processes.

The terms "recover" and "recovery", as used herein, mean a contraction of a stretched material upon termination of a biasing force following stretching of the material by application of the biasing force. For example, if a material having a relaxed, unbiased length of one (1) cm is elongated 50 percent by stretching to a length of one and one half (1.5) cm the material would be elongated 50 percent (0.5 cm) and would have a stretched length that is 150 percent of its relaxed length. If this exemplary stretched material contracted, that is, recovered to a length of one and one tenth (1.1) cm after release of the biasing and stretching force, the material would have recovered 80 percent (0.4 cm) of its one-half (0.5) cm elongation. Recovery can be expressed as [(maximum stretch length−final sample length)/(maximum stretch length−initial sample length)] times 100.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which can be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin.

As used herein, the term "spunbonded fibers" means small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spun-bonding mechanisms. The production of spun-bonded non-woven webs is illustrated in patents such as, for example, in U.S. Pat. No. 4,340,563 to Appel et al., and U.S. Pat. No. 3,692,618 to Dorschner et al.

As used herein, the term "coform" means a non-woven composite material of air-formed matrix material including thermoplastic polymer microfibers having an average fiber diameter of less than about 10 microns, and a multiplicity of individualized absorbent fibers such as, for example, wood pulp fibers disposed throughout the matrix of polymer microfibers and engaging at least some of the microfibers to space the microfibers apart from each other. The absorbent fibers are interconnected by and held captive within the matrix of microfibers by mechanical entanglement of the microfibers with the absorbent fibers, the mechanical entanglement and interconnection of the microfibers and absorbent fibers alone forming a coherent integrated fibrous structure. These materials are prepared according to the descriptions in U.S. Pat. No. 4,100,324 to Anderson et al. U.S. Pat. No. 5,508,102 to Georger et al. and U.S. Pat. No. 5,385,775 to Wright.

As used herein, the term "microfibers" means small diameter fibers having an average diameter not greater than about 100 microns, for example, having an average diameter of from about 0.5 microns to about 50 microns, or more particularly, microfibers may have an average diameter of from about 4 microns to about 40 microns.

As used herein, the term "autogenous bonding" means bonding provided by fusion and/or self-adhesion of fibers and/or filaments without an applied external adhesive or bonding agent. Autogenous bonding can be provided by contact between fibers and/or filaments while at least a portion of the fibers and/or filaments are semi-molten or tacky. Autogenous bonding may also be provided by blending a tackifying resin with the thermoplastic polymers used to form the fibers and/or filaments. Fibers and/or filaments formed from such a blend can be adapted to self-bond with or without the application of pressure and/or heat. Solvents may also be used to cause fusion of fibers and filaments which remains after the solvent is removed.

As used herein, the term "machine direction (MD)" is the direction of travel of the forming surface onto which fibers are deposited during formation of a non-woven fibrous web.

As used herein, the term "cross-machine direction (CD)" is the direction that is essentially perpendicular to the machine direction defined above.

As used herein, the term "tensile strength" is the maximum load or force (i.e., peak load) encountered while elongating the sample to break. Measurements of peak load are made in the machine and cross-machine directions using wet samples.

As used herein, the term "wet-wipe" means a fibrous sheet which, during its manufacture, has a liquid applied thereto so that the liquid will be retained within the fibrous sheet until its utilization by a consumer. The liquid may include a fragrance and/or an emollient and may serve to aid the sheet in retention of materials which are to be wiped up during its utilization.

As used herein, the terms "stretch-bonded laminate" or "composite elastic material" means a non-woven fabric material having at least one of the layer of material being elastic and at least one layer of the material being non-elastic, e.g., a gatherable layer. The elastic web layer(s) are joined or bonded to at least at least two locations to the non-elastic web layer(s). Preferably, the bonding is at intermittent bonding points or areas while the non-woven web layer(s) are in juxtaposed configuration and while the elastic non-woven web layer(s) have a tensioning force applied thereto in order to bring the elastic non-woven web to a stretched state. Upon removal of the tensioning force after joining of the web layers, an elastic non-woven web layer will attempt to recover to its unstretched condition and will thereby gather the non-elastic non-woven web layer between the points or areas of joining of the two layers. The composite material is elastic in the direction of stretching of the elastic layer during joining of the layers and can be stretched until the gathers of the non-elastic layer have been removed. A stretch-bonded laminate may include more than two layers. For example, the elastic layer may have a non-elastic web layer joined to both of its sides while it is in a stretched condition so that a three layer non-woven web composite is formed having the structure of gathered non-elastic (non-woven web or film)/elastic (non-woven web or film)/gathered non-elastic (non-woven web or film). Yet other combinations of elastic and non-elastic layers can also be utilized. Such composite elastic materials are disclosed, for example, by U.S. Pat. No. 4,720,415 to Vander Wielen et al., and U.S. Pat. No. 5,385,775 to Wright.

As used herein, "thermal point bonding" involves passing a material such as two or more webs of fibers to be bonded between a heated calendar roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. In one embodiment of this invention the bond pattern allows void spaces in the machine direction to allow a gatherable layer to gather when the stretched elastic web retracts.

As used herein, the term "superabsorbent" refers to a water swellable, substantially insoluble organic or inorganic material capable of absorbing at least 10 times its weight of an aqueous solution containing 0.9 wt % of sodium chloride.

As used herein, the term "palindromic" means a multilayer laminate, for example a stretch-bonded laminate, which is substantially symmetrical. Examples of palindromic laminates could have layer configurations of A/B/A, A/B/B/A, A/A/B/B/A/A, A/B/C/B/A, and the like. Examples of non-palindromic layer configurations would include A/B/C, A/B/C/A, A/B/C/D, etc.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

SUMMARY OF THE INVENTION

The problem of lack of softness or cloth-like feel associated with previous composite elastic materials has been addressed by the composite elastic material of the present invention, which is adapted to provide a more cloth-like feel than otherwise available. This can be accomplished by providing a non-woven composite material having a first thickness and a second thickness. The second thickness is greater than the first thickness and, thus, provides a softer, more cloth-like feeling composite elastic material.

The composite elastic material of one embodiment contains at least one elastic layer including an elastic layer having embedded elastic fibers and at least one gatherable layer joined at spaced apart locations to the elastic layer so that the gatherable layer is gathered between the spaced-apart locations.

The gatherable layer can be a non-woven web of fibers, such as, for example, a web of spunbonded fibers, a web of meltblown fibers, a bonded carded web of fibers, a multilayer material including at least one of the webs of spunbonded fibers, meltblown fibers, or a bonded carded web of fibers. The gatherable layer may also be a mixture of fibers and one or more other materials such as, for example, wood pulp, staple-length fibers, particulates and super-absorbent materials. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, to Anderson et al.

In another aspect of the invention, the elastic composite is formed into a wet-wipe, which is removably stored in a container. The wet-wipe has a non-woven laminate of an elastic layer and at least one gathered layer, the gathered layer being bonded to the elastic layer at at least two points and being gathered between the at least two points, the non-woven laminate having a first thickness within the container and a second thickness outside the container, the second thickness being greater than the first thickness. The second thickness provides the user of the wet-wipe with a softer feeling wet-wipe than the thinner wet-wipe having the first thickness.

Another aspect of the invention is a method for increasing the thickness of a wet-wipe, the wet-wipe in a first mode having a relaxed length and a first thickness, including stretching the wet-wipe in a second mode beyond its relaxed length to an extended length, and recovering the wet-wipe in a third mode to about the relaxed length, causing the wet-wipe to have a second thickness greater than the first thickness. The thicker, second mode wet-wipe provides a softer wet-wipe.

DETAILED DESCRIPTION

Figure 1:
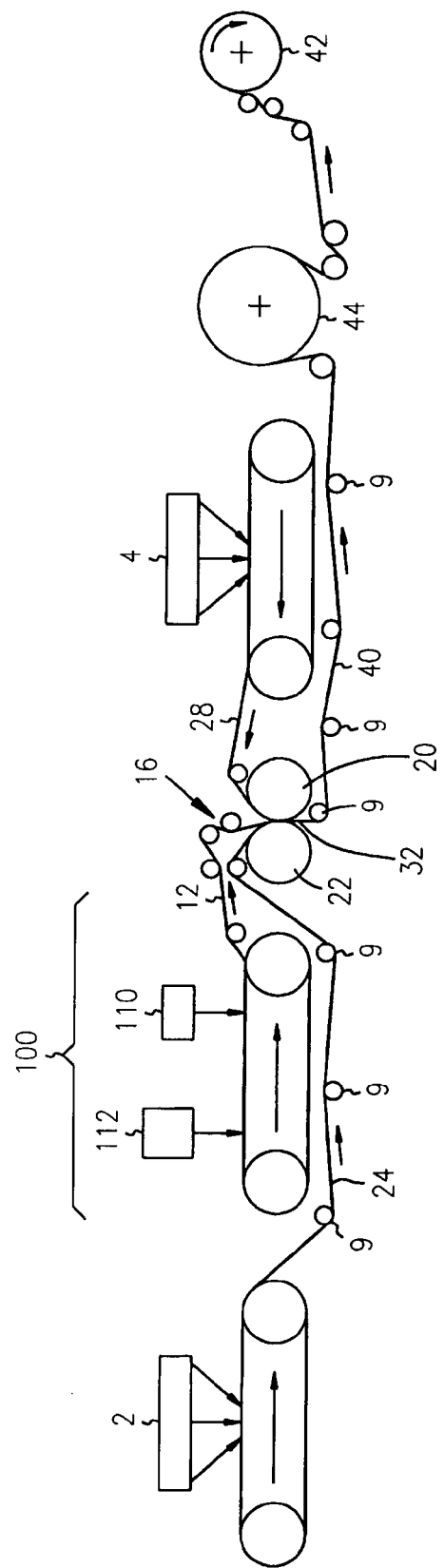
FIG. 1 is a schematic drawing of an exemplary process for forming a composite elastic material of the present invention.

The present invention provides a composite elastic material such as, for example, a stretch-bonded laminate which is adapted to provide improved softness and cloth-like feel. This can be accomplished by providing, a non-woven composite material having a low cup crush and a low density, while maintaining a desired level of strength and tear resistance. This composite elastic material can include an elastic fibrous web that can be a composite of elastomeric fiber and elastomeric meltblown fibers.

The softness and cloth-like texture (feel) is further enhanced by stretching the stretch-bonded laminate prior to use, and allowing the laminate to return (recover) to about its relaxed state or mode. The stretching and recovery causes the thickness of the laminate to increase; thereby, increasing the softness and cloth-like texture of the laminate. One use of the laminate is a disposable wet-wipe.

The wet-wipes of the present invention provide improved softness and cloth-like feel because they have a combination of properties, having a low cup crush (i.e., increased flexibility) and a low density (i.e., maximum bulk per unit mass), while maintaining a desired level of strength and tear resistance (i.e., sufficient tensile strength in both MD and CD) that were not previously available in wet-wipes. The wet-wipes of the invention include a non-woven composite elastic material having at least one elastic layer and at least one gatherable layer. The gatherable layer is bonded to the elastic layer at at least two points; and is gathered between the bonded points. The elastic layer includes a non-woven web having embedded elastic fibers, arranged in a substantially parallel configuration. Moreover, softness and cloth-like texture are further enhanced by stretching and relaxing the wet-wipe; thereby, causing the at least one non-woven gatherable layer to increase in thickness.

The feel of a wet-wipe is often characterized by one or more of the following attributes of the materials that comprise them: thickness, bulk density, flexibility, texture, softness, density, and durability. In preparing a wet-wipe having a soft cloth-like feel, it is important to balance the properties of the composite elastic material, e.g., cup crush, density, and tensile strength. However, this is a difficult task because these properties can be interdependent i.e., changing one property can adversely affect another property (of the wet-wipe). Thus, when one property is varied to enhance the softness, careful attention should be paid to how the other properties are affected to avoid preparing a product with a coarser feel.

The composite elastic material has a density less than about 0.085 g per cubic cm, in its initial (non-stretched and recovered) state and a CD tensile strength of greater than about 0.68 pounds per inch. The composite material can have a cup crush less than about 120 g per cm and can have a cup crush to density ratio of less than about 1579 $cm^2$ and greater than about 950 $cm^2$. Preferably, the cup crush to density ratio can be less than about 1500 $cm^2$ and greater than about 1000 $cm^2$. More preferably, the cup crush to density ratio can be less than about 1400 $cm^2$ and greater than about 1100 $cm^2$. Most preferably, the cup crush to density ratio can be less than about 1300 $cm^2$ and greater than about 1100 $cm^2$.

The preferred CD tensile strength is of greater than about 0.70 lbs. A more preferred CD tensile strength is of greater than about 0.75 lbs. A slightly more preferred CD tensile strength is of greater than about 0.80 lbs. A yet more preferred CD tensile strength is of greater than about 0.85 lbs. A much more preferred CD tensile strength is of greater than about 0.90 lbs. A very much more preferred CD tensile strength is of greater than about 0.95 lbs. The most preferred CD tensile strength is of greater than about 1.0 lbs. Accordingly, it is desired to have the highest tensile strength without adversely effecting the other properties of the composite to such an extent that the composite becomes undesirable in the marketplace due to a lack of softness and cloth-like feel.

The basis weight (in grams per square meter, $g/m^2$ or gsm) is calculated by dividing the dry weight by the area (in square meters). The density of the wet-wipe, as used herein, is a "wet density" and is calculated as the basis weight (in grams per square meter, $g/m^2$ or gsm) divided by the thickness of the wet-wipe after wetting with the solution.

The wet-wipes of the present invention include a basesheet of the composite elastic material and a liquid. The liquid can be any solution which can be absorbed into the wet-wipe basesheet and may include any suitable components which provide the desired wiping properties. For example, the components may include water, emollients, surfactants, fragrances, preservatives, chelating agents, pH buffers or combinations thereof as are known to those skilled in the art. The liquid may also contain lotions and/or medicaments.

The amount of liquid contained within each wet-wipe may vary depending upon the type of material being used to provide the wet-wipe, the type of liquid being used, the type of container being used to store the wet-wipes, and the desired end use of the wet-wipe. Generally, each wet-wipe can contain from about 150 to about 600 weight percent and preferably from about 250 to about 450 weight percent liquid based on the dry weight of the wipe for improved wiping. In a more preferred embodiment, the amount of liquid contained within the wet-wipe is from about 300 to about 400 weight percent and desirably about 330 weight percent based on the dry weight of the wet-wipe. If the amount of liquid is less than the above-identified ranges, the wet-wipe may be too dry and may not adequately perform. If the amount of liquid is greater than the above-identified ranges, the wet-wipe may be over-saturated and soggy and the liquid may undesirably pool in the bottom of the container.

Each wet-wipe is generally rectangular in shape and may have any suitable unfolded width and length. For example, the wet-wipe may have an unfolded length of from about 2.0 to about 80.0 centimeters and desirably from about 10.0 to about 27.0 centimeters, and an unfolded width of from about 2.0 to about 80.0 centimeters and desirably from about 10.0 to about 25.0 centimeters. Preferably, each individual wet-wipe is arranged in a folded configuration and stacked one on top of the other to provide a stack of wet-wipes. Such folded configurations are known to those skilled in the art and include c-folded, z-folded, quarter-folded configurations and the like. The stack of folded wet-wipes are typically placed in an interior of a container, such as a plastic tub, to provide a package of wet-wipes for eventual sale to the consumer. Alternatively, the wet-wipes may include a continuous strip of material which has perforations separating individual wet-wipes and which may be arranged in a stack or wound into a roll for individual dispensing.

The layered basesheet of the wet-wipes of the present invention includes at least two layers of material having different physical properties. The different physical properties which a layer may be configured to provide by selecting the appropriate materials include softness, resiliency, strength, flexibility, integrity, toughness, absorbency, liquid retention, thickness, tear resistance, surface texture, drapability, hand, wettability, wicking ability and the like, and combinations thereof. Preferably, the materials used for the layered basesheet are configured to provide softness and flexibility while maintaining adequate strength, integrity and resiliency, particularly when wetted. For example, the wet-wipes may include at least one layer of material which is configured to provide strength and resilience to the wet-wipe and at least one other layer which is configured to provide a soft, gentle wiping surface to the wet-wipe. Preferably, the wet-wipes include a soft layer on each side of a strong and resilient layer such that both exposed surfaces of the wipe provide a soft, gentle surface for contact with the skin.

Elements in the drawings which are the same or similar in more than one view may be designated by the same reference number for clarity of description.

FIG. 1 illustrates a process, 10, for forming a stretch-bonded laminate which includes an elastic fibrous web 12. The elastic fibrous web 12 is prepared in a web forming machine 100 (illustrated in detail in FIG. 2) and travels in the direction indicated by the arrows associated therewith. The elastic fibrous web layer 12 passes through an S-roll arrangement 16 before entering the horizontal calender having a patterned calender roller 20 and an anvil roller 22. The calender roller 20 can have from 1 to about 30% embossing pin bond area with the preferred area being from about 12 to about 14%. Both the anvil and pattern rollers can be heated to provide thermal point bonding as described above. The temperature and nip forces required to achieve adequate bonding are dependent on the material being laminated. It should be noted that the positions of the calender roller 20 and an anvil roller 22 in FIG. 1 are illustrative only and can be reversed.

A first gatherable layer 24 and a second gatherable layer 28 are prepared in the coform banks 2 and 4 (illustrated in detail in FIG. 3) and are guided and\or tensioned by rollers 9. FIG. 1 shows numerous rollers for guiding and\or tensioning the gatherable layers 24 or 28. For clarity of illustration not all rollers are labeled with reference number 9. It will be understood that all schematic depictions of rollers 9, circles in contact with a layer 24 or 28, as well as composite 40, in FIG. 1 are rollers 9. The gatherable layers 24 and 28 further pass through the horizontal calender 20, 22 with the elastic layer 12. The layers are bonded by the calender roller 20 and the anvil roller 22 to form composite 40. The gatherable layers can be formed using one or more sets of extruders for providing the microfibers. The microfibers can be formed by extrusion processes such as, for example, meltblowing processes or spunbonding.

The coherent integrated fibrous structure of layers 24 and 28 may be formed by the microfibers and wood pulp fibers without any adhesive, molecular or hydrogen bonds between the two different types of fibers. The absorbent fibers are preferably distributed uniformly throughout the matrix of microfibers to provide a homogeneous material. The material is formed by initially forming a primary air stream containing the melt blown microfibers, forming a secondary air stream containing the wood pulp fibers, merging the primary and secondary streams under turbulent conditions to form an integrated air stream containing a thorough mixture of the microfibers and wood pulp fibers, and then directing the integrated air stream onto a forming surface to air form the fabric-like material. The microfibers are in a soft nascent condition at an elevated temperature when they are turbulently mixed with the wood pulp fibers in air.

The coform layer(s), layers 24 and 28 in the illustrated embodiment, can have from 20-50 wt. % of polymer fibers and 80-50 wt. % of pulp fibers. The preferred ratio of polymer fibers to pulp fibers can be from 25-40 wt. % of polymer fibers and 75-60 wt. % of pulp fibers. A more preferred ratio of polymer fibers to pulp fibers can be from 30-40 wt. % of polymer fibers and 70-60 wt. % of pulp fibers. The most preferred ratio of polymer fibers to pulp fibers can be from 35 wt. % of polymer fibers and 65 wt. % of pulp fibers.

Non-limiting examples of the polymers suitable for practicing the invention are polyolefin materials such as, for example, polyethylene, polypropylene and polybutylene, including ethylene copolymers, propylene copolymers and butylene copolymers thereof. A particularly useful polypropylene is Basel PF-105. Additional polymers are disclosed in U.S. Pat. No. 5,385,775.

Fibers of diverse natural origin are applicable to the invention. Digested cellulose fibers from softwood (derived from coniferous trees), hardwood (derived from deciduous trees) or cotton linters may be utilized. Fibers from Esparto grass, bagasse, kemp, flax, and other lignaceous and cellulose fiber sources may also be utilized as raw material in the invention. For reasons of cost, ease of manufacture and disposability, preferred fibers are those derived from wood pulp (i.e., cellulose fibers). A commercial example of such a wood pulp material is available from Weyerhaeuser as CF-405. Generally wood pulps will be utilized. Applicable wood pulps include chemical pulps, such as Kraft (i.e., sulfate) and sulfite pulps, as well as mechanical pulps including, for example, ground wood pulp, thermomechanical pulp (i.e., TMP) and chemithermomechanical pulp (i.e., CTMP). Completely bleached, partially bleached and unbleached fibers are useful herein. It may frequently be desired to utilize bleached pulp for its superior brightness and consumer appeal.

Also useful in the present invention are fibers derived from recycled paper, which can contain any or all of the above categories as well as other non-fibrous materials such as fillers and adhesives used to facilitate the original paper making process.

The elastic fibrous web 12 passes through S-rollers 16 in a reverse-S path as viewed in FIG. 1. From the S-roll arrangement, the elastic fibrous web 12 passes through pressure nip 32 formed in the horizontal calender 20, 22 by a bonding roller arrangement. Additional S-roll arrangements (not shown) can be introduced between the illustrated S-roller arrangement and the calender roller arrangement to stabilize the stretched material and to control the amount of stretching. Because the peripheral linear speed of the rollers of the S-roll arrangement is controlled to be less than the peripheral linear speed of the rollers of the calender roller arrangement, the elastic fibrous web 12 is tensioned between the S-roll arrangement and the pressure nip 32 formed in the horizontal calender roller arrangement. The filaments of the elastic fibrous web 12 typically run along the direction that the web is stretched so that they can provide the desired stretch properties in the finished composite material. By adjusting the difference in the speeds of the rollers, the elastic fibrous web is tensioned so that it stretches a desired amount and is maintained in a stretched condition while the gatherable layers 24 and 28 are joined to the elastic fibrous web 12 during their pass through the calender roller arrangement to form a composite elastic material 40. The elastic fibrous web can be stretched in the range from about 25% (i.e., a 1 cm length can be stretched to 1.25 cm) to about 300% (i.e., a 1 cm length can be stretched to 4 cm) of its relaxed length. Preferably, the web can be stretched to from about 30% to about 150% of its relaxed length. More preferably, the web can be stretched to from about 75% to about 100% of its relaxed length.

The composite elastic material, 40, can be relaxed upon release of the tensioning force provided by the S-roll arrangement and the calender rollers. The gatherable layers are gathered in the composite elastic material 40. The composite elastic material 40 is then wound up on a winder roll 42. Optionally, composite elastic material 40 is activated by heat treatment in a heat activation unit 44. Processes of making composite elastic materials of this type are described in, for example, U.S. Pat. No. 4,720,415 to Vander Wielen et al. and U.S. Pat. No. 5,385,775 to Wright.

In an alternative embodiment the gatherable layer(s) can be supplied from a supply roll(s) (not shown) in place of the coform banks 2 and 4. When a second gatherable layer 28 is employed, this would be supplied from a separate supply roll than layer 24.

Gatherable layers 24 and 28 can be non-woven materials such as, for example, spunbonded webs, meltblown webs, air laid layer webs, bonded carded webs, hydroentangled webs, wet-formed webs or any combination thereof. In one embodiment of the present invention, one or both of gatherable layers 24 and 28 is a multilayer material having, for example, at least one layer of spunbonded web joined to at least one layer of meltblown web, bonded carded web or other suitable material.

One or both of the gatherable layers 24 and 28 can be a composite material made of a mixture of two or more different fibers or a mixture of fibers and particulates. Such mixtures can be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, to Anderson et al.

A coherent integrated fibrous structure can be formed by the microfibers and absorbent fibers without any adhesive, molecular or hydrogen bonds between the two different types of fibers. The absorbent fibers are preferably distributed uniformly throughout the matrix of microfibers to provide a homogeneous material. The material is formed by initially forming a primary air stream containing the melt blown microfibers, forming a secondary air stream containing the wood pulp fibers, merging the primary and secondary streams under turbulent conditions to form an integrated air stream containing a thorough mixture of the microfibers and wood pulp fibers, and then directing the integrated air stream onto a forming surface to air form the fabric-like material. The microfibers are in a soft nascent condition at an elevated temperature when they are turbulently mixed with the wood pulp fibers in air.

In one embodiment, gatherable layers 24 and 28 are coform layers having from 20-50 wt. % of polymer fibers and 80-50 wt. % of pulp fibers. The preferred ratio of polymer fibers to pulp fibers can be from 25-40 wt. % of polymer fibers and 75-60 wt. % of pulp fibers. A more preferred ratio of polymer fibers to pulp fibers can be from 30-40 wt. % of polymer fibers and 70-60 wt. % of pulp fibers. The most preferred ratio of polymer fibers to pulp fibers can be from 35 wt. % of polymer fibers and 65 wt. % of pulp fibers.

One or both of the gatherable layers 24 and 28 can be made of pulp fibers, including wood pulp fibers, to form a material such as, for example, a tissue layer. Additionally, the gatherable layers can be layers of hydraulically entangled fibers such as, for example, hydraulically entangled mixtures of wood pulp and staple fibers such as disclosed in U.S. Pat. No. 4,781,966, to Taylor.

The gatherable layers 24 and 28 can be joined to the elastic fibrous web 12 at least at two places by any suitable means such as, for example, thermal bonding or ultrasonic welding which softens at least portions of at least one of the materials, usually the elastic fibrous web because the elastomeric materials used for forming the elastic fibrous web 12 have a lower softening point than the components of the gatherable layers 24 and 28. Joining can be produced by applying heat and/or pressure to the overlaid elastic fibrous web 12 and the gatherable layers 24 and 28 by heating these portions (or the overlaid layer) to at least the softening temperature of the material with the lowest softening temperature to form a reasonably strong and permanent bond between the re-solidified softened portions of the elastic fibrous web 12 and the gatherable layers 24 and 28.

The bonding (calender) roller arrangement includes a smooth anvil roller 22 and a patterned calendar roller 20, such as, for example, a pin embossing roller arranged with a smooth anvil roller. One or both of the smooth anvil roller and the calendar roller can be heated and the pressure between these two rollers can be adjusted by well-known structures to provide the desired temperature, if any, and bonding pressure to join the gatherable layers to the elastic fibrous web. As can be appreciated, the bonding between the gatherable layers and the elastic sheet is a point bonding. Various bonding patterns can be used, depending upon the desired tactile properties of the final composite laminate material. The bonding points are preferably evenly distributed over the bonding area of the composite material. One embodiment of the bonding of the gatherable layer(s) and the elastic layer is explained below in conjunction with FIG. 10.

With regard to thermal bonding, one skilled in the art will appreciate that the temperature to which the materials, or at least the bond sites thereof, are heated for heat-bonding will depend not only on the temperature of the heated roller(s) or other heat sources but on the residence time of the materials on the heated surfaces, the compositions of the materials, the basis weights of the materials and their specific heats and thermal conductivities. Typically, the bonding can be conducted at a temperature of from about 40° to about 80° C. The bonding can be conducted at a temperature of from about 55° to about 75° C. The bonding can be conducted at a temperature of from about 60° to about 70° C. The typical pressure range, on the rollers, can be from about 18 to about 56.8 Kg per linear cm (KLC) The preferred pressure range, on the rollers, can be from about 18 to about 24 Kg per linear cm (KLC) However, for a given combination of materials, and in view of the herein contained disclosure, the processing conditions necessary to achieve satisfactory bonding can be readily determined by one of skill in the art.

The elastic fibrous web 12 can also be preformed and unwound from a supply roll (not shown) and passed directly through the S-roll arrangement 16 before being bonded to a gatherable layer 24 or 28 at nip 32. The gatherable layers 24 and 28 can be preformed and unwound from supply rolls (not shown) and passed directly through the horizontal calender arrangement 20, 22.

Conventional drive means, e.g. electric motors, and other conventional devices which can be utilized in conjunction with the apparatus of FIG. 1 are well known and, for purposes of clarity, have not been illustrated.

One component of the composite elastic material 40 is the elastic fibrous web 12. The elastic web can be a web including meltblown fibers or the web can contain two or more layers of materials; where at least one layer can be a layer of elastomeric meltblown fibers and at least one layer can contain substantially parallel rows of elastomeric fibers autogenously bonded to at least a portion of the elastomeric meltblown fibers. The elastomeric fibers can have an average diameter ranging from about 40 to about 750 microns and extend along length (i.e. machine direction) of the fibrous web. The elastomeric fibers can have an average diameter in the range from about 50 to about 500 microns, for example, from about 100 to about 200 microns.

The elastic fibers extending along the length (i.e., MD) of the fibrous web increases the tensile modulus about 10% more than the increase in the tensile modulus of the fibrous web in the width (i.e. CD). For example, the tensile modulus of an elastic fibrous web can be about 20% to about 90% greater in the MD than the tensile modulus of a substantially isotropic non-woven web having about the same basis weight containing only elastomeric meltblown fibers. This increased MD tensile modulus increases the amount of retraction that can be obtained for a given basis weight of the composite elastic material.

The elastic fibrous web can contain at least about 20 percent, by weight, of elastomeric fibers. For example, the elastic fibrous web can contain from about 20 percent to about 100 percent, by weight, of the elastomeric fibers. Preferably, the elastomeric fibers can constitute from about 20 to about 60 percent, by weight, of the elastic fibrous web. More preferably, the elastomeric fibers can constitute from about 20 to about 40 percent, by weight, of the elastic fibrous web.

Figure 2:
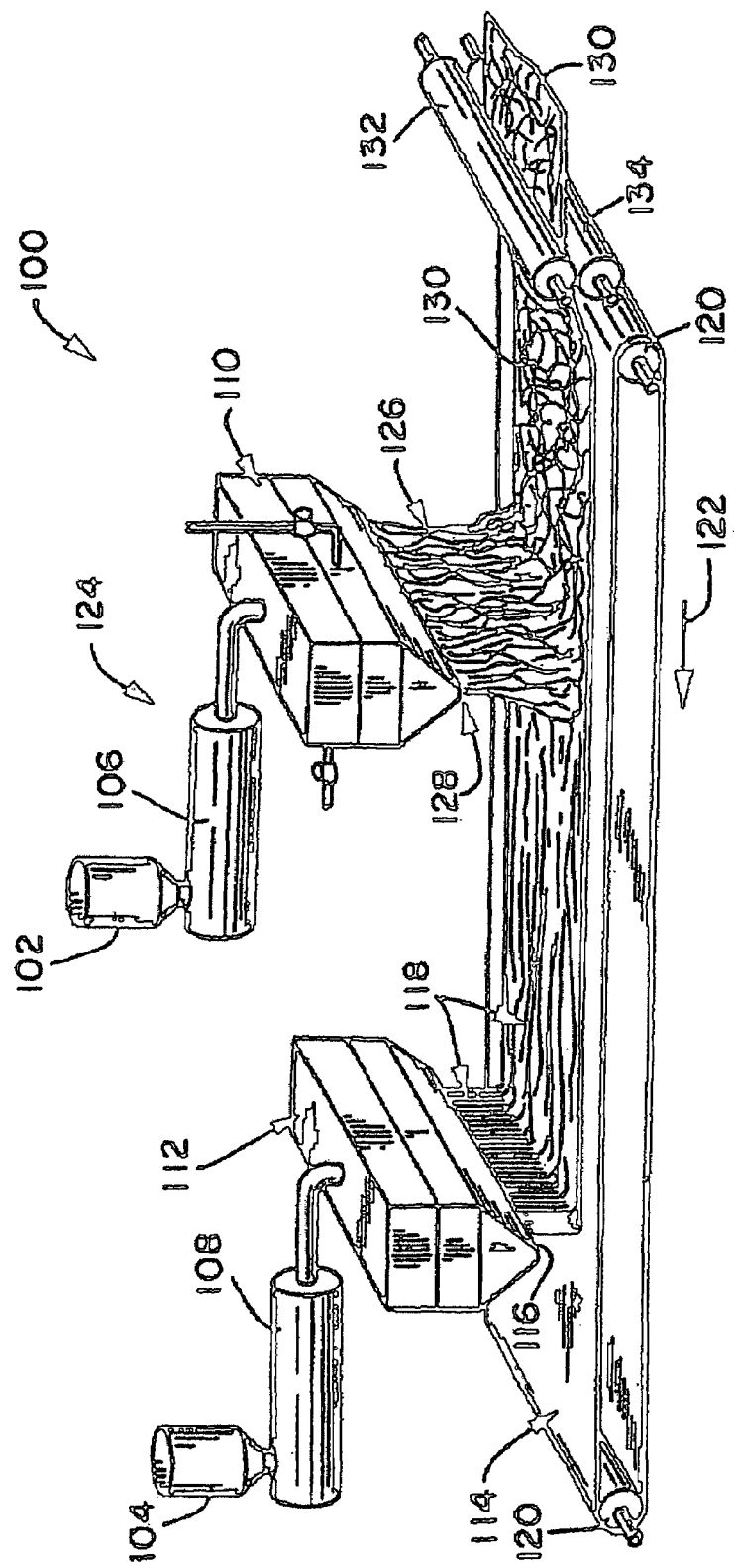
FIG. 2 is a schematic drawing of an exemplary process for forming an elastic fibrous web, which is a component of the composite elastic material of the present invention.

FIG. 2 is a schematic view of system 100 for forming an elastic fibrous web which can be used as a component of the composite elastic material of the present invention. In forming the fibers which are used in the elastic fibrous web, pellets or chips, etc. (not shown) of an extrudable elastomeric polymer are introduced into pellet hoppers 102 and 104 of extruders 106 and 108.

Each extruder has an extrusion screw (not shown) which is driven by a conventional drive motor (not shown). As the polymer advances through the extruder, due to rotation of the extrusion screw by the drive motor, it is progressively heated to a molten state. Heating the polymer to the molten state can be accomplished in a plurality of discrete steps with its temperature being gradually elevated as it advances through discrete heating zones of the extruder 106 toward a meltblowing die 110 and extruder 108 toward a continuous filament forming unit 112. The meltblowing die 110 and the continuous filament forming unit 112 can be yet another heating zone where the temperature of the thermoplastic resin is maintained at an elevated level for extrusion. Heating of the various zones of the extruders 106 and 108 and the meltblowing die 110 and the continuous filament forming unit 112 can be achieved by any of a variety of conventional heating arrangements (not shown).

The elastomeric filament component of the elastic fibrous web can be formed utilizing a variety of extrusion techniques. For example, the elastic fibers can be formed utilizing one or more conventional meltblowing die units, which have been modified to remove the heated gas stream (i.e., the primary air stream) that flows generally in the same direction as that of the extruded threads to attenuate the extruded threads. This modified meltblowing die unit 112 usually extends across a foraminous collecting surface 114 in a direction which is substantially transverse to the direction of movement of the collecting surface 114. The modified die unit 112 includes a linear array 116 of small diameter capillaries aligned along the transverse extent of the die with the transverse extent of the die being approximately as long as the desired width of the parallel rows of elastomeric fibers which is to be produced. That is, the transverse dimension of the die is the dimension which is defined by the linear array of die capillaries. Typically, the diameter of the capillaries can be on the order of from about 0.025 cm (0.01 in.) to about 0.076 cm (0.03 in.). Preferably, the diameter of the capillaries can be from about 0.368 cm (0.0145 in.) to about 0.0711 cm (0.028 in.). More preferably, the diameter of the capillaries can be from about 0._cm (0._in.) to about 0._cm (0._in.). From about 5 to about 50 such capillaries can be provided per linear inch of die face. Typically, the length of the capillaries can be from about 0.127 cm (0.05 in.) to about 0.508 cm (0.20 in.). Typically, the length of the capillaries can be about 0.287 cm (0.113 in.) to about 0.356 cm (0.14 in.) long. A meltblowing die can extend from about 51 cm (20 in.) to about 152 or more cm (about 60 in.) in length in the transverse direction.

Since the heated gas stream (i.e., the primary air stream) which flows past the die tip is greatly reduced or absent, it is desirable to insulate the die tip or provide heating elements to ensure that the extruded polymer remains molten and flowable while in the die tip. Polymer is extruded from the array 116 of capillaries in the modified die unit 112 to create extruded elastomeric fibers 118.

The extruded elastomeric fibers 118 have an initial velocity as they leave the array 116 of capillaries in the modified die unit 112. These fibers 118 are deposited upon a foraminous surface 114 which should be moving at least at the same velocity as the initial velocity of the elastic fibers 118. This foraminous surface 114 is an endless belt conventionally driven by rollers 120. The fibers 118 are deposited in substantially parallel alignment on the surface of the endless belt 114 which is rotating as indicated by the arrow 122 in FIG. 2. Vacuum boxes (not shown) can be used to assist in retention of the matrix on the surface of the belt 114. The tip of the die unit 112 is positioned as close as practical to the surface of the foraminous belt 114 upon which the continuous elastic fibers 118 are collected. For example, this forming distance can be from about 2 inches to about 10 inches. Desirably, this distance is from about 2 inches to about 8 inches.

It may be desirable to have the foraminous surface 114 moving at a speed that is much greater than the initial velocity of the elastic fibers 118 in order to enhance the alignment of the fibers 118 into substantially parallel rows and/or elongate the fibers 118 so they achieve a desired diameter. For example, alignment of the elastomeric fibers 118 can be enhanced by having the foraminous surface 114 move at a velocity from about 2 to about 10 times greater than the initial velocity of the elastomeric fibers 118. Even greater speed differentials can be used if desired. While different factors will affect the particular choice of velocity for the foraminous surface 114, it will typically be from about four to about eight times faster than the initial velocity of the elastomeric fibers 118.

Desirably, the continuous elastomeric fibers are formed at a density per inch of width of material which corresponds generally to the density of capillaries on the die face. For example, the filament density per inch of width of material may range from about 10 to about 120 such fibers per inch width of material. Typically, lower densities of fibers (e.g., 10-35 fibers per inch of width) can be achieved with only one filament forming die. Higher densities (e.g., 35-120 fibers per inch of width) can be achieved with multiple banks of filament forming equipment.

The meltblown fiber component of the elastic fibrous web is formed utilizing a conventional meltblowing device 124. Meltblowing devices 124 generally extrude a thermoplastic polymer resin through a plurality of small diameter capillaries of a meltblowing die as molten threads into a heated gas stream (the primary air stream) which is flowing generally in the same direction as that of the extruded threads so that the extruded threads are attenuated, i.e., drawn or extended, to reduce their diameter. Such meltblowing techniques, and apparatus therefor, are discussed fully in U.S. Pat. No. 4,663,220 to Wisneski et al.

In the meltblown die arrangement 110, the position of air plates which, in conjunction with a die portion define chambers and gaps, can be adjusted relative to the die portion to increase or decrease the width of the attenuating gas passageways so that the volume of attenuating gas passing through the air passageways during a given time period can be varied without varying the velocity of the attenuating gas. Generally speaking, lower attenuating gas velocities and wider air passageway gaps are generally preferred if substantially continuous meltblown fibers or microfibers are to be produced.

The two streams of attenuating gas converge to form a stream of gas which entrains and attenuates the molten threads, as they exit the orifices, into fibers depending upon the degree of attenuation, microfibers, of a small diameter which is usually less than the diameter of the orifices. The gas-borne fibers or microfibers 126 are blown, by the action of the attenuating gas, onto a collecting arrangement which, in the embodiment illustrated in FIG. 2, is the foraminous endless belt 114 which carries the elastomeric filaments in substantially parallel alignment. The fibers or microfibers 126 are collected as a coherent matrix of fibers on the surface of the elastomeric fibers 118 and foraminous endless belt 114 which is rotating as indicated by the arrow 122 in FIG. 2. If desired, the meltblown fibers or microfibers 126 can be collected on the foraminous endless belt 114 at numerous impingement angles. Vacuum boxes (not shown) can be used to assist in retention of the matrix on the surface of the belt 114. Typically the tip 128 of the die 110 is from about 6 inches to about 14 inches from the surface of the foraminous belt 114 upon which the fibers are collected. The entangled fibers or microfibers 124 autogenously bond to at least a portion of the elastic continuous fibers 118 because the fibers or microfibers 124 are still somewhat tacky or molten while they are deposited on the elastic continuous fibers 118, thereby forming the elastic fibrous web 130. The fibers are quenched by allowing the fibers cool to a temperature below about 38° C.

As discussed above, the elastomeric fibers and elastomeric meltblown fibers can be deposited upon a moving foraminous surface. In one embodiment of the invention, meltblown fibers can be formed directly on top of the extruded elastomeric fibers. This is achieved by passing the fibers and the foraminous surface under equipment which produces meltblown fibers. Alternatively, a layer of elastomeric meltblown fibers can be deposited on a foraminous surface and substantially parallel rows of elastomeric fibers can be formed directly upon the elastomeric meltblown fibers. Various combinations of filament forming and fiber forming equipment can be set up to produce different types of elastic fibrous webs. For example, the elastic fibrous web may contain alternating layers of elastomeric fibers and elastomeric meltblown fibers. Several dies for forming meltblown fibers or creating elastomeric fibers may also be arranged in series to provide superposed layers of fibers.

The elastomeric meltblown fibers and elastomeric fibers can be made from any material that can be manufactured into such fibers such as natural polymers or synthetic polymers. Generally, any suitable elastomeric fiber forming resins or blends containing the same can be utilized for the elastomeric meltblown fibers and any suitable elastomeric filament forming resins or blends containing the same can be utilized for the elastomeric fibers. The fibers can be formed from the same or different elastomeric resin.

For example, the elastomeric meltblown fibers and/or the elastomeric fibers can be made from block copolymers having the general formula A—B—A' where A and A' are each a thermoplastic polymer endblock which can contain a styrenic moiety such as a poly (vinyl arene) and where B is an elastomeric polymer midblock such as a conjugated diene or a lower alkene polymer. The block copolymers can be, for example, (polystyrene/poly(ethylene-butylene)/polystyrene) block copolymers available from the Shell Chemical Company under the trademark KRATON RTM. G. One such block copolymer can be, for example, KRATON RTM. G-1657.

Other exemplary elastomeric materials which can be used include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E. I. DuPont De Nemours & Company. Formation of elastomeric meltblown fibers from polyester elastomeric materials is disclosed in, for example, U.S. Pat. No. 4,741,949.

Useful elastomeric polymers also include, for example, elastic copolymers of ethylene and at least one vinyl monomer such as, for example, vinyl acetates, unsaturated aliphatic monocarboxylic acids, and esters of such monocarboxylic acids. The elastic copolymers and formation of elastomeric meltblown fibers from those elastic copolymers are disclosed in, for example, U.S. Pat. No. 4,803,117 to Daponte. Also, suitable elastomeric polymers are those prepared using metallocene catalysts such as those disclosed in International Application WO 00/48834.

Processing aids can be added to the elastomeric polymer. For example, a polyolefin can be blended with the elastomeric polymer (e.g., the A—B—A elastomeric block copolymer) to improve the processability of the composition. The polyolefin must be one which, when so blended and subjected to an appropriate combination elevated pressure and elevated temperature conditions, extrudable, in blended form, with the elastomeric polymer. Useful blending polyolefin materials include, for example, polyethylene, polypropylene and polybutylene, including ethylene copolymers, propylene copolymers and butylene copolymers. A particularly useful polyethylene can be obtained from the U.S.I. Chemical Company under the trade designation Betrothing NA 601 (also referred to herein as PE NA 601 or polyethylene NA 601). Two or more of the polyolefins can be utilized. Extrudable blends of elastomeric polymers and polyolefins are disclosed in, for example, previously referenced U.S. Pat. No. 4,663,220.

The elastomeric meltblown fibers and/or the elastomeric fibers can have some tackiness adhesiveness to enhance autogenous bonding. For example, the elastomeric polymer itself can be tacky when formed into fibers and/or fibers or, optionally, a compatible tackifying resin can be added to the extrudable elastomeric compositions described above to provide tackified elastomeric fibers and/or fibers that autogenously bond. In regard to the tackifying resins and tackified extrudable elastomeric compositions, note the resins and compositions as disclosed in U.S. Pat. No. 4,787,699, to Moulin.

Any tackifier resin can be used which is compatible with the elastomeric polymer and can withstand the high processing (e.g., extrusion) temperatures. If the elastomeric polymer (e.g., A—B—A elastomeric block copolymer) is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ™ and ARKON™ series tackifiers are examples of hydrogenated hydrocarbon resins. ZONATAK™ 501 lite is an example of a terpene hydrocarbon. REGALREZ™ hydrocarbon resins are available from Hercules incorporated. ARKON™ series resins are available from Arakawa Chemical (U.S.A.) Inc. The present invention is not limited to use of these tackifying resins, and other tackifying resins which are compatible with the other components of the composition and can withstand the high processing temperatures, can also be used.

Typically, the blend used to form the elastomeric fibers include, for example, from about 40 to about 95 percent by weight elastomeric polymer, from about 5 to about 40 percent polyolefin and from about 5 to about 40 percent resin tackifier. For example, a particularly useful composition included, by weight, about 61 to about 65 percent KRATON™ G-1657, about 17 to about 23 percent polyethylene polymer, and about 15 to about 20 percent REGALREZ™ 1126. The preferred polymers are metallocene catalyzed polyethylene polymers, such as, for example Affinity® polymers, available from Dow® Chemical Company as Affinity XUS59400.03L.

The elastomeric meltblown fiber component of the present invention can be a mixture of elastic and nonelastic fibers or particulates. For example, such a mixture, is disclosed in U.S. Pat. No. 4,209,563 to Sisson, where elastomeric and non-elastomeric fibers are commingled to form a single coherent web of randomly dispersed fibers. Another example of such an elastic composite web could be made by a technique disclosed in previously cited U.S. Pat. No. 4,741,949 to Morman et al. This patent discloses an elastic non-woven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, activated charcoal, clays, starches, or hydrocolloid (hydrogel) particulates commonly referred to as super-absorbents occurs prior to collection of the fibers upon a collecting device to form a coherent web of randomly dispersed fibers.

Figure 3:
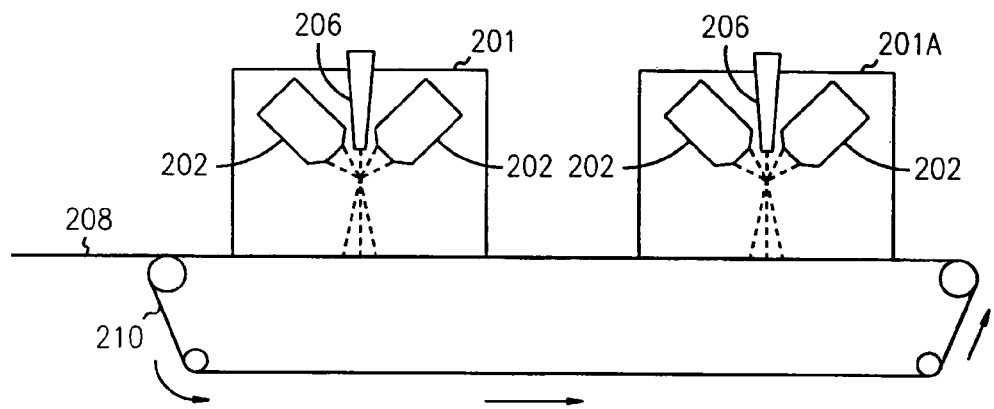
FIG. 3 is a schematic drawing of an exemplary process for preparing a gatherable layer.
Figure 3A:
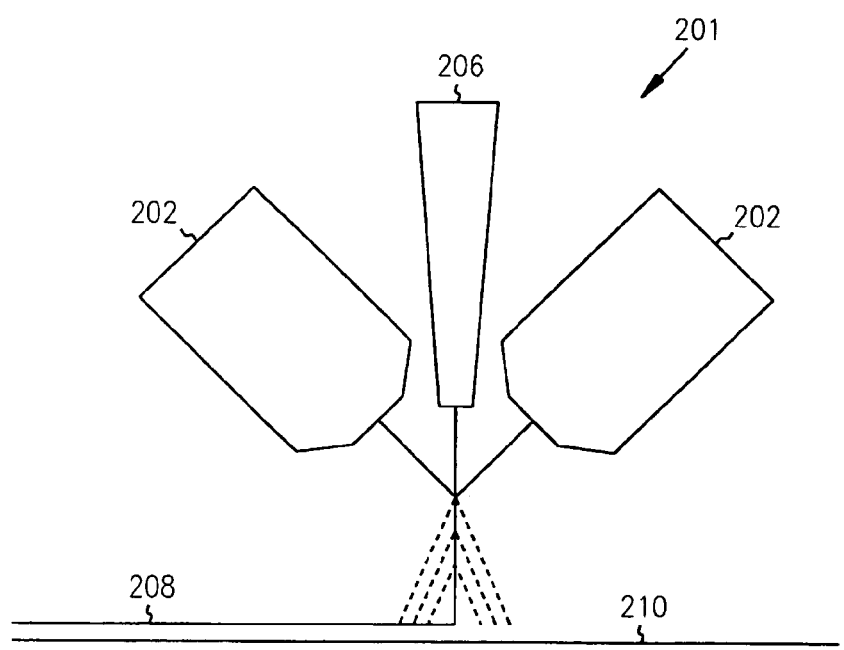
FIG. 3A is an enlarged view of the pulp generator of FIG. 3.

FIG. 3 is a schematic view of an exemplary process for forming a gatherable web or layer 24 and 28 such as coform, which can be used as a component of the composite elastic material of the invention. The matrix material comprising thermoplastic polymer microfibers from the extruder banks 201 and 201A (201A is an optional additional extruder bank) of the meltblowing extruders 202, are blended with the individualized absorbent fibers from the pulp generator 206. The non-woven web 208 is carried along the forming wire 210 to the calender or wound on a roll.

If desired, the composite elastic material of the invention can be heat activated. Heat activation can provide dimensional stability in the web by increasing the retraction that occurs in the manufacturing process. Elevating the temperature of the web and imparting energy to the elastomer can cause it to retract beyond the range achievable at ambient conditions. There are numerous heat activation methods including, but not limited to, through-air heating, surface heating, infrared, microwave, and liquid transfer. The heat activation step can also be executed in multiple locations such as the in-line manufacturing process, after material winding, or during converting. In-line through-air heat activation is the method illustrated because it provides good heat transfer.

Figure 4:
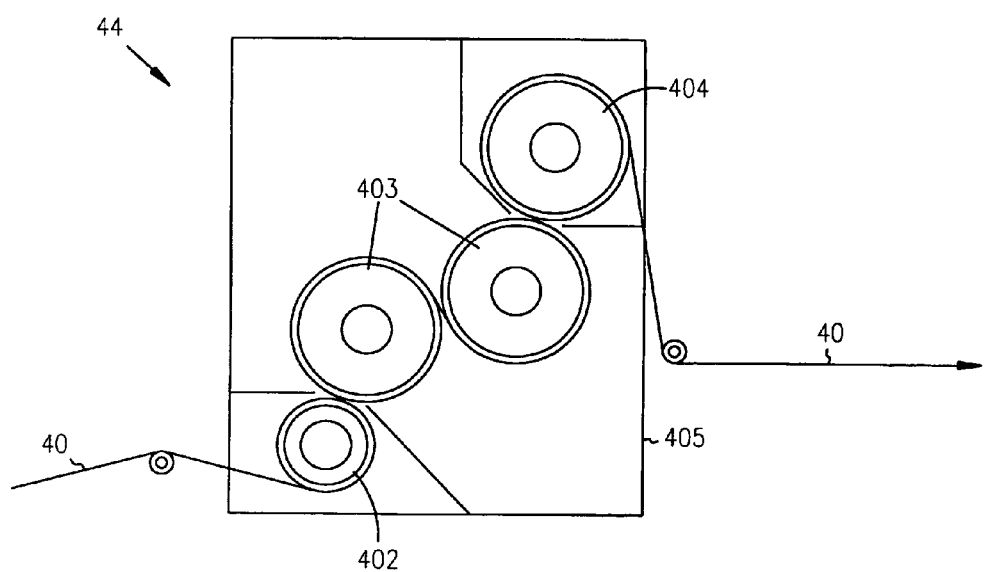
FIG. 4 is a schematic drawing of an exemplary process for the heat treatment of the composite elastic material of the present invention activated by treatment in a heat activator.

In the embodiment of this invention illustrated in FIG. 4, the composite elastic web 40 is allowed to retract as much as possible at ambient temperatures and fed into the heat activation unit 44. Web 40 is stretched, heated to about 57° C. and allowed to retract. This retraction occurs after the web travels from a vacuum drum in the heating section to a vacuum drum in the quenching section. After this additional retraction has occurred the web is cooled on the quench vacuum roll(s) to preserve this retracted state as the web is processed further. More particularly, a transfer roller 402 feeds web into heat activation unit 44. The vacuum rolls 403 (two shown) provide the necessary residence time for heat activation to occur. Heated air is supplied to the chamber 405 containing the vacuum rolls and evacuated through the center of the vacuum rolls. If multiple rollers are employed they can be operated at the same speed or at different speeds. One or more vacuum rollers 404 is provided to allow residence time in the quenching/cooling chamber 406 to reduce the fabric temperature to ambient conditions. If multiple rollers are employed they can be operated at the same speed or at different speeds. The quenching vacuum roller(s) can be run at a slower speed than the vacuum roller(s) in the heating section to allow retraction to occur prior to cooling the web. The quenching roll/rolls can run 6-10% slower than the rolls in the heating section.

Figure 5:
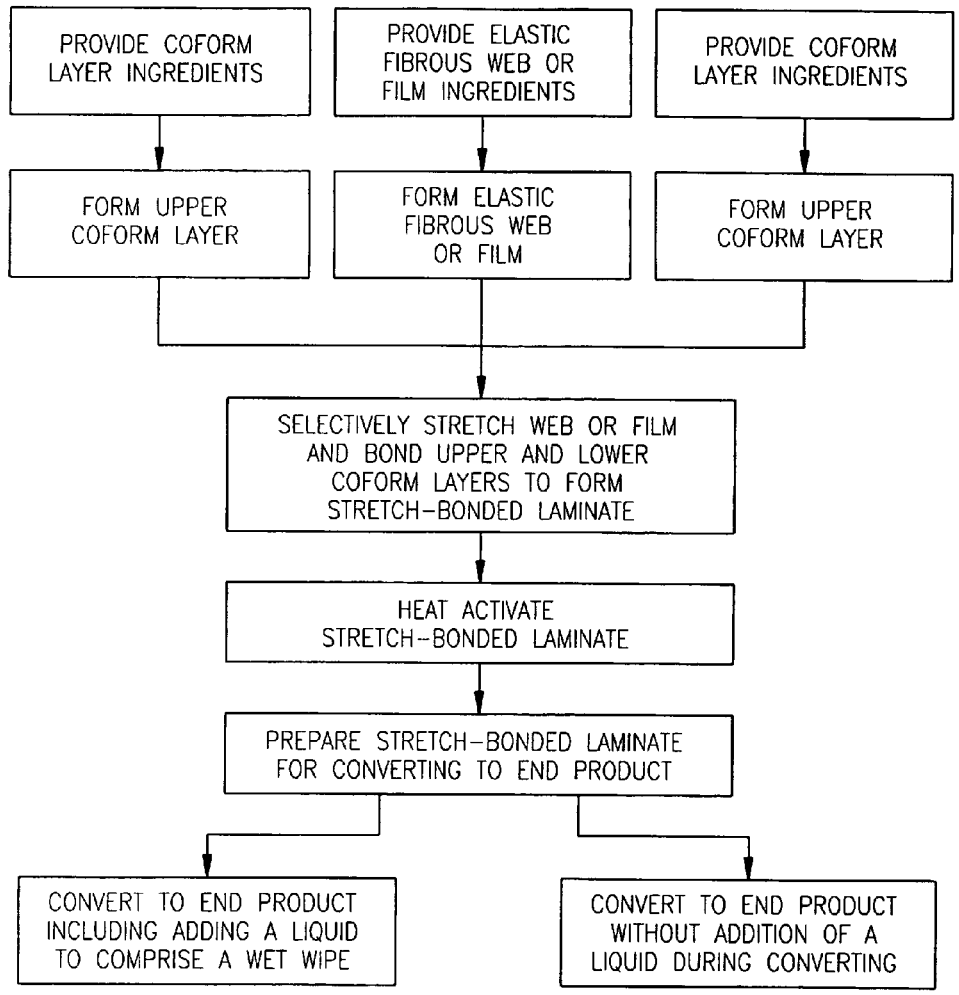
FIG. 5 is a flowchart of a process for the preparation of the composite elastic material of the present invention.

FIG. 5 shows a flowchart representing steps for producing a composite or laminate according to the present invention. It is believed that these steps are described herein and further description in not necessary.

Various properties of the composite of the present invention were determined during laboratory tests. The laboratory conditions under which testing was performed generally adhere to ASTM E 171, "Standard Atmospheres for Conditioning and Testing Materials", as well as 21 CFR 58.61-63, "Good laboratory practices for nonclinical laboratory studies" and CFR 211.160(b)(4), "Current Good Manufacturing Practices for Finished Pharmaceuticals".

Figure 11:
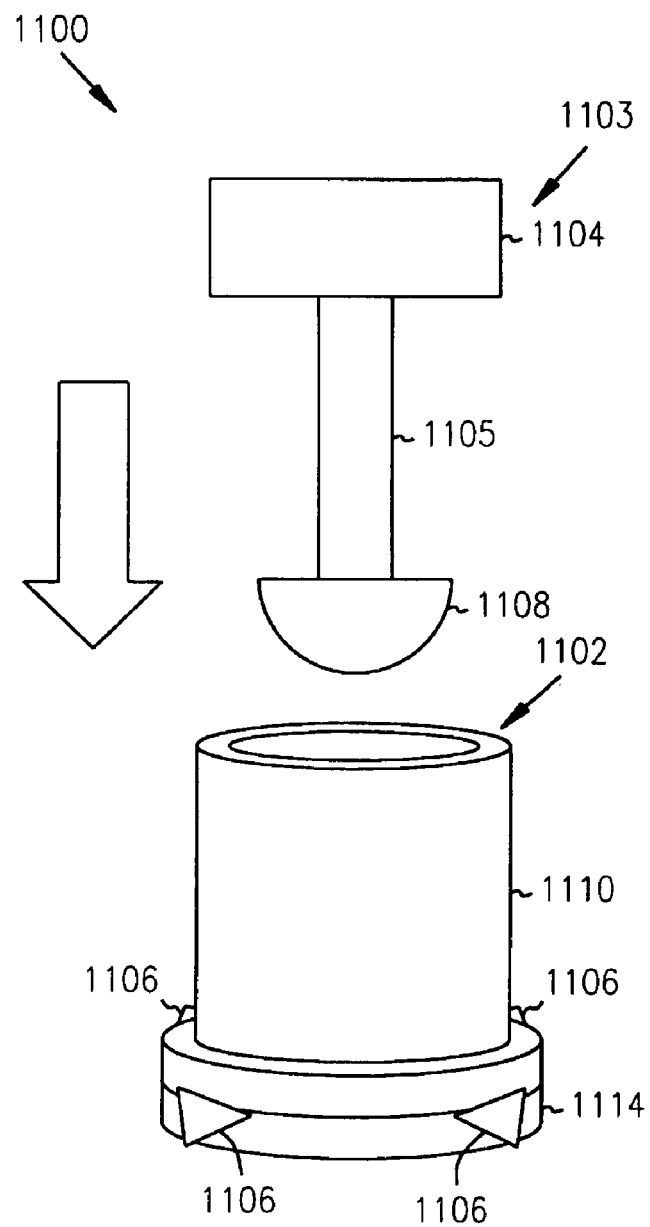
FIG. 11 is a view of a load testing apparatus for testing a composite according to the present invention.
Figure 12:
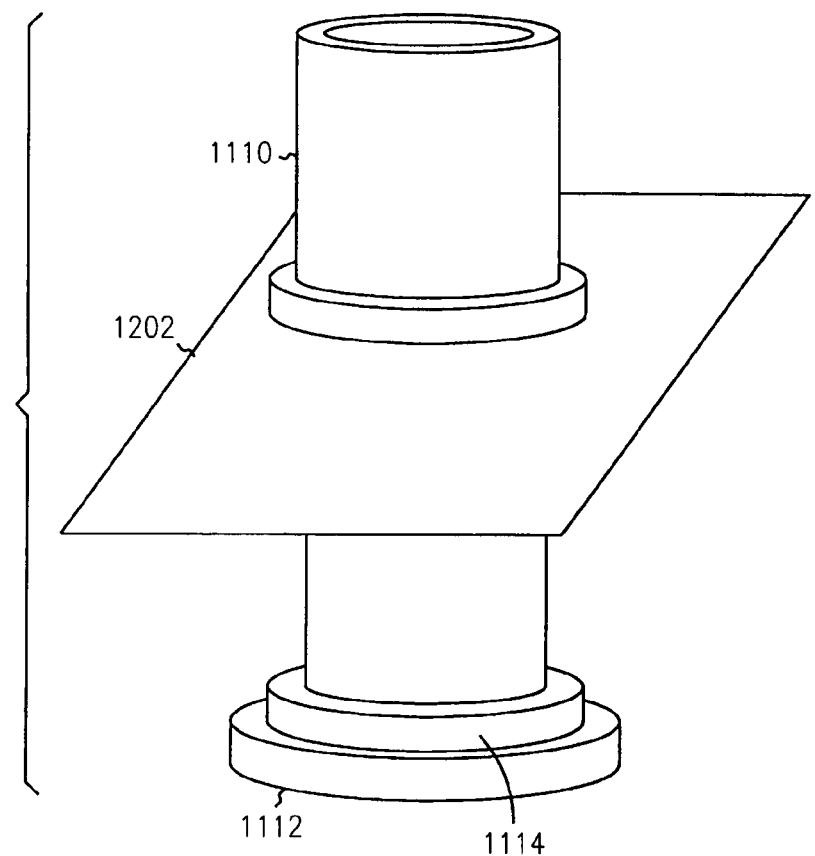
FIG. 12 is an exploded view of the load testing apparatus of FIG. 11.

FIGS. 11 and 12 show a cup-crush testing system 1100 which includes a cup forming assembly 1102 and force testing unit 1103. The force testing unit 1103 includes a force sensor housing 1104 to which is cantilevered a rigid rod 1105. A hemispherical foot 1108 is positioned at the free end of rod 1105. Force sensor housing 1104 includes force sensors for measuring the force experienced at foot 1108 and transferred through rigid rod 1105. The assembly 1102 includes mating, top-hat shaped former cups 1110 and 1112, which grip a sheet 1202, such as wet-wipe 1000, at at least four points. The four corners 1106 of sheet 1202 extend outside of the assembly 1102. The cup 1112 includes a gripping ring 1114 around its base to assist in holding the sheet 1202 between the cups 1110 and 1112. Another embodiment is a cup that is similar to cup 1112 except it does not have a gripping ring.

One measure of the softness of a non-woven fabric sheet 1202 is determined according to the "cup crush" test by system 1100. The cup crush test evaluates fabric stiffness by measuring the peak load (also called the "cup crush load" or just "cup crush") required for a 4.5 cm diameter hemispherically shaped foot 1108 to crush a 17.8 cm by 17.8 cm piece of fabric shaped into an approximately 6.5 cm diameter by 6.5 cm tall cup 1112 while the now cup shaped fabric 1102 is surrounded by an approximately 6.5 cm diameter cylinder cup 1110 to maintain a uniform deformation of the cup shaped fabric 1102. There can be gaps between the ring and forming cup, but at least four corners 1106 must be fixedly pinched therebetween. The foot 1108, the cylinder cup 1110 and the cup 1112 are aligned to avoid contract between the cup walls and the foot that could affect the readings. The load is measured in grams, and recorded a minimum of twenty times per second while the foot is descending at a rate of about 406 mm per minute and is measured in grams. The cup crush test provides a value for the total energy required to crush a sample (the "cup crush energy") which is the energy over a 4.5 cm range beginning 0.5 cm below the top of the fabric cup, i.e., the area under the curve formed by the load in grams on one axis and the distance the foot travels in millimeters on the other. Cup crush energy is reported in gm-mm (or inch-pounds). A lower cup crush value indicates a softer material. A suitable device for measuring cup crush is a model FTD-G-500 load cell (500 gram range) available from the Schaevitz Company, Pennsauken, N.J.

The peak load tensile test is a measure of breaking strength and elongation or strain of a fabric when subjected to unidirectional stress. This test is known in the art and is similar to ASTM-1117-80, section seven, which uses a 12-inch per minute strain rate. The results are expressed in grams to break and percent stretch before breakage. Higher numbers indicate a stronger, more stretchable fabric. The term "load" means the maximum load or force, expressed in units of weight, required to break or rupture the specimen in a tensile test. The term "strain" or "total energy" means the total energy under a load versus elongation curve as expressed in weight-length units. The term "elongation" means the increase in length of a specimen during a tensile test and is given in percent. Values for tensile strength and elongation are obtained using a specified width of fabric, in this case 1 inch (25.4 mm), clamp width and a constant rate of extension. The test is conducted using wet product as would be representative of consumer use. Fabric testing can be conducted in both the machine direction (MD) and cross-machine direction (CD) which can be determined by one familiar with non-woven materials by the orientation of the fibers. It is important that the samples be either parallel or perpendicular to the machine direction to insure accuracy. The test is conducted using a 2 inch (50.8 mm) wide clamp with one smooth face and one 0.25 inch round horizontal rod comprising each clamp mechanism. The specimen is clamped in, for example, an Instron Model™, available from the Instron Corporation, 2500 Washington St., Canton, Mass. 02021, or a Thwing-Albert Model INTELLECT II available from the Thwing-Albert Instrument Co., 10960 Dutton Rd., Phil., Pa. 19154, which have 3 inch (76 mm) long parallel clamps. This closely simulates fabric stress conditions in actual use.

The caliper of the composite elastic materials of the invention is a measure of thickness. The thickness is measured at 0.05 psi with a Starret-type bulk tester, in units of millimeters using a 7.62 cm (3 in) diameter platen. This test is conducted on the finished wet-wipe product and care must be taken to insure the platen does not fall on a fold or wrinkle that has resulted from packaging.

The density of the wet-wipe, as used herein is a wet-density calculated and is calculated as the basis weight divided by the caliper (measured wet). The wet thickness is employed so as to represent the product as obtained by a consumer. The commercially available wet-wipes that were used for comparison testing are usually only available in the form of a wet finished product. Dry basis weight is used to accurately assess the wet-density by elimination of variability caused by the amount of solution on the various brands of wet-wipes.

The wet-wipes are removed from their container and randomly selected. Each wipe is unfolded, numbered and measured (length and width). The wipes are stacked and compressed to about 15-20 metric tons in a press for about 10 seconds. This step is repeated until a steady stream of solution is no longer observed. The wipes are draped over a rod and placed in a drying oven at 105±2 degrees C. for about 2 hours. The dry wipes are allowed to cool for about 14-15 minutes and weighed to ±0.01 g.

The invention will now be illustrated by the following non-limiting examples.

EXAMPLE 1

Wet wipes were made as described in the present application. Each wet wipe contained a three-layer laminate composite elastic material, which included two gatherable outer coform layers and an inner elastomeric core.

Elastomeric Core

The elastomeric layer in this example is produced using a two bank meltblown process and a single continuous speed foraminous belt. The first bank of the meltblown process was setup to extrude elastomeric filaments/fibers directly onto the foraminous belt in a substantially parallel configuration without the use of heated primary air to draw the filaments. A metallocene-catalyzed polyethylene resin available from DOW Chemical Company, under the trade designation of Dow Affinity XUS59400.03L, were used to produce the fibers at a nominal melt temperature of 220 degrees C. The substantially parallel fibers were extruded through a spin beam with a nominal hole size of 0.07 cm and a density of 7 holes per cm. The velocity of the polymer through the spin beam and speed of the foraminous belt were adjusted to produce a web of fibers with a basis weight of 21 grams per square meter. The fiber web basis weight, the density of the capillaries in the spin beam, and the capillary size dictates the drawing ratio of the elastomeric filaments.

The second bank in the meltblown process/system operates as a conventional meltblown head. The molten thermoplastic is extruded through fine die capillaries converging into a hot air stream, which attenuates the filaments of molten material reducing their diameter. The high velocity air stream carries these meltblown fibers to the constant speed foraminous surface. Such a process is disclosed for example in U.S. Pat. No. 3,849,241 to Butin. The meltblown head used here utilizes 0.368 cm diameter capillaries at a density of 12 capillaries per cm, and operates at a melt temperature of 250 degrees C. The elastomeric polymer used to produce the meltblown fibers is a dry blended resin in the following proportions: 80% Dow Affinity XUS59400.03L, 15% Regalrez 1126, and 5% Dow 6806. As the meltblown fibers are deposited on the foraminous surface carrying the previously formed, substantially parallel, filament autogeneous bonding occurs and discrete points where the still molten fibers cross over the filaments. The basis weight of the web prepared is about 9 grams per square meter.

The web is then cooled to a temperature less than about 35 degrees C. by drawing ambient air through the foraminous belt as the web travels over a vacuum box. This cooling is required prior to removing the web from the foraminous surface.

Stretching

The web is transported to an S-wrap roll arrangement by a series of idler rollers. The S-wrap rollers are driven to control their speed, and this combined with the large surface contact serve as a nip. The speed of the foraminous meltblown forming belt and S-wrap rollers travel at about the same speed and this speed is 50% of the speed of the calender rolls. This speed difference results in a 100% elongation of the elastic web between the S-wrap rolls and the calender roll. This stretching effect reduces the basis weight by about 50% and imparts significant stored energy to the elastomeric web as it is presented to be joined with the gatherable layers.

Gatherable Coform Layers

The gatherable coform layers were comprised of intermingled polypropylene meltblown fibers and fiberized softwood pulp. The polypropylene comprised 35 weight percent of the gatherable layer with the softwood pulp comprising the remaining 65 weight percent. Each coform layer is an air formed matrix produced utilizing a coform process with two forming stations. At each forming station an air stream containing fiberized softwood pulp (available under the trade designation CF-405 from Weyerhaeuser Corporation) is merged with two heated primary air streams containing polypropylene (available from BASELL under the trade designation PF-105) meltblown fibers. The two polypropylene meltblown streams oppose each other at an angle of 90 degrees and the pulp air stream is contained between these streams at an angle of 45 degrees to each. The air streams merge under turbulent conditions at a distance of approximately 20 cm above a constant speed foraminous surface. This first coform layer then travels on the foraminous surface under a second forming station producing a second layer of equal portions and basis weight. The second coform layer is bonded through mechanical entanglement to the first layer by virtue of the high velocity forming air common to coform processes. The second gatherable layer is formed in a similar fashion to the first.

The first and second gatherable layers are formed simultaneously by different forming stations on separate foraminous belting surfaces, which rotate in opposite directions conveying the coform layers toward each other. The coform layers are then removed from the foraminous surfaces and conveyed by conventional means to the vertical calender.

Combining

After leaving the foraminous surfaces the first and second gatherable layers enter the vertical embossing calender from opposite directions as shown in FIG. 1. (Alternatively, the gatherable layers could be traveling from a foraminous surface in the same direction into a calender, and in yet in another embodiment these gatherable layers may be transferred from a wound roll rather than foraminous surface).

The elastomeric web enters the calender between the two gatherable layers in an elongated state (about twice the formed length, or 100% elongation), and could come from a separate foraminous surface as it does in the example, or from a wound roll. The smooth anvil roll and patterned calender roll bond the layers together at a plurality of discrete points in the configuration shown in FIG. 10. The heated bond rolls and high pressure cause additional mechanical entanglement and thermal bonding of the polymers in the fabric. A temperature of 65 degrees C. and an embossing pressure of 21 kg per linear centimeter are used here.

Retracting

As the composite web leaves the calender the stored energy in the elastomer is released as the web is conveyed at a decreasing linear speed through the process and the elastomeric core gathers the exterior layers. With the components described the retraction occurs over a period of about 4 seconds and dictates an appropriate free web span for the given calender roll speed. For example if the calender roll has a linear speed of 5 meters per second then the web must be free to retract and decelerate over a distance of 20 meters. The exemplary composite web described herein retracts about 25% during this gathering step. This results in an increase in the basis weight of the web, corresponding to about 25%.

Heat Activation

In order to obtain further retraction and increase the dimensional stability of the composite, same is transferred to a foraminous drum where it is held at a fixed dimension by vacuum. While held on the rotating, foraminous drum, or similar surface, the temperature of the web is elevated near the glass transition temperature of the elastomeric center layer by drawing a heated air stream through the web. Monitoring the temperature of the elastomeric portion of the composite is not possible as it is located between the gatherable layers and therefore the temperature of the external gatherable layers is used to monitor the process and is measured as it exits transitions off the foraminous drum. This is a reasonable approximation as the heat transfer with the through-air process. The external web temperature required for this example is about 55 degrees C. Once heated the web is transferred to another vacuum drum, or similar surface, through space. This second drum is traveling slower than the heated drum (approximately 5% for this example) and additional retraction occurs between the two surfaces. Again an increase in basis weight of the web occurs. The second drum draws ambient air through the web reducing the temperature back to ambient following this retraction step.

The fabric can then be converted into individual wet wipes using numerous cutting, folding, wetting, and stacking methods known in the art. The wet wipes included a solution similar to that currently being used with Kleenex™ Huggies™ Supreme Care Scented baby wipes, which were commercially available from Kimberly-Clark Corporation, a business having offices located in Neenah, Wis. The wet wipes included about 330 weight percent of the solution based on the dry weight of the wipe.

EXAMPLE 2

Following the procedure of Example 1 a composite elastic material was prepared using an elastomeric web containing 100% elastomeric meltblown fibers at a basis weight of 25 grams per square meter.

EXAMPLE 3

A particularly suitable solution for the wet wipes of the present invention was prepared according to the following formulation:

| Ingredient CTFA Designation | wt. % |
|---|---|
| Water | 98.52 |
| Potassium Laureth mono alkyl phosphate | 0.6 |
| Glycerin | 0.29 |
| Polysorbate-20 | 0.30 |
| Sodium hydroxymethylglycinate | 0.20 |
| Propylparaben | 0.1 |
| Fragrance | 0.05 |

The potassium laureth mono alkyl phosphate was commercially available from Rhone-Poulenc under the trade designation RHODAFAC. The Polysorbate-20 was commercially available from Rhone Poulenc under the trade designation ALKAMULS PSML-20. The sodium hydroxymethylglycinate was commercially available from Sutton Labs, a business having offices located in Catham, N.J., under the trade designation SUTTOCIDE A. Malic acid was then added to the solution to bring the pH level to 5.5. The solution exhibited a silky, lubricious feel and was relatively nonirritating to the skin.

EXAMPLE 4

A suitable solution for the wet wipes of the present invention was prepared according to the following formulation:

| Ingredient CTFA Designation | wt. % |
|---|---|
| Water | 97.02 |
| Potassium Coco mono alkyl phosphate | 0.4 |
| Propylene Glycol | 0.5 |
| Polysorbate-20 | 0.30 |
| Sodium hydroxymethylglycinate | 0.15 |
| Fragrance | 0.03 |

The potassium coco mono alkyl phosphate was commercially available from Rhone-Poulenc under the trade designation RHODAFAC. The Polysorbate-20 was commercially available from Rhone-Poulenc under the trade designation ALKAMULS PSML-20. The sodium hydroxymethylglycinate was commercially available from Sutton Labs, a business having offices located in Chatham, N.J., under the trade designation SUTTOCIDE A. Malic acid was then added to the solution to bring the pH level to 5.5. The solution was cloudy, exhibited a slight silky after feel and precipitated.

COMPARATIVE EXAMPLE

The composite elastic material, prepared according to Example 1, was formed into sheets and moistened, using a solution prepared according to Example 3, to provide wet-wipes. These wet-wipes were compared to commercially available wet-wipes obtained from about September 1996 through about January 2000 as recited in Table I.

Figure 6:
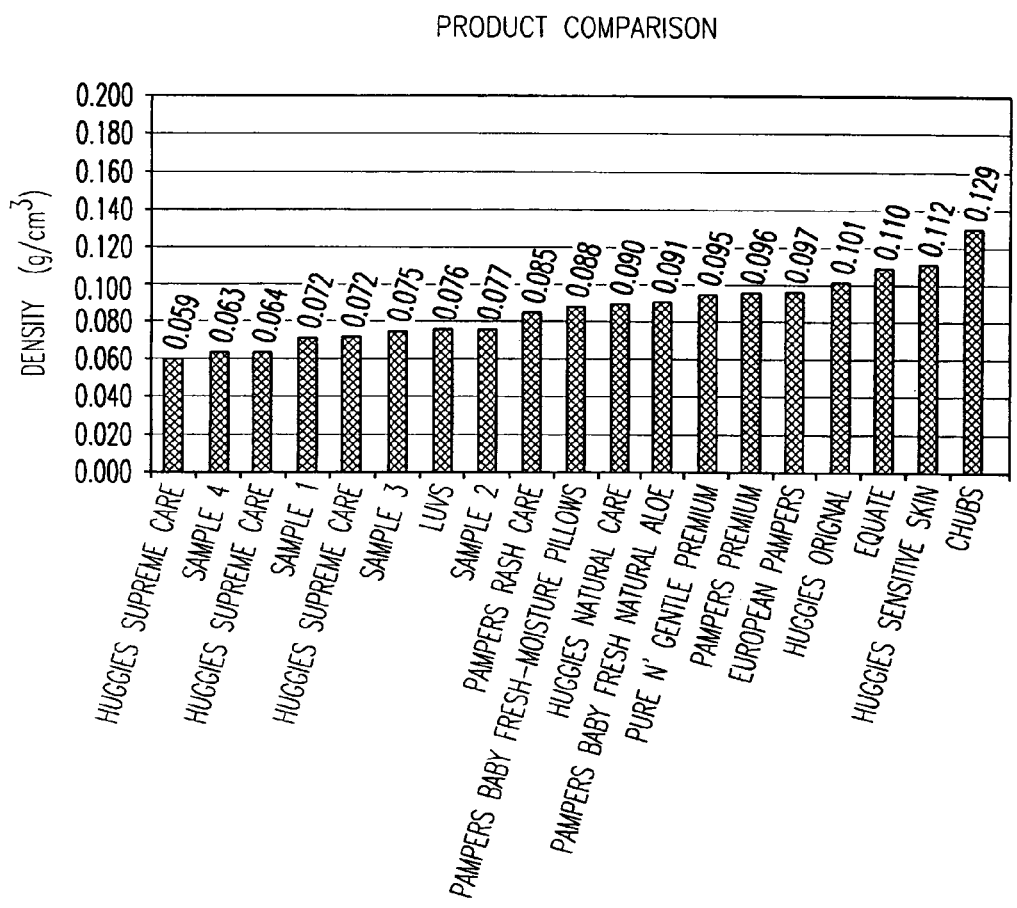
FIG. 6 is a chart of wet density of several commercially available wet-wipes and the wet density of the wet-wipes of the present invention.
Figure 7:
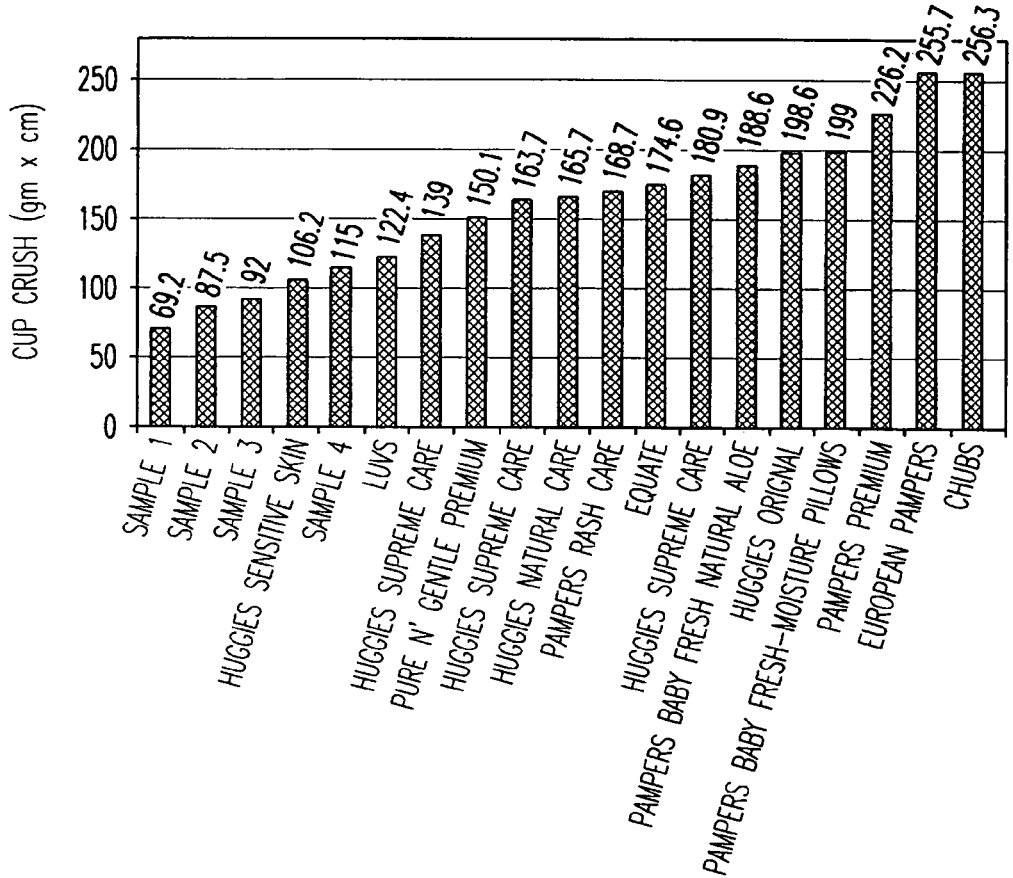
FIG. 7 is a chart of cup crush of several commercially available wet-wipes and the cup crush of the wet-wipes of the present invention.
Figure 8:
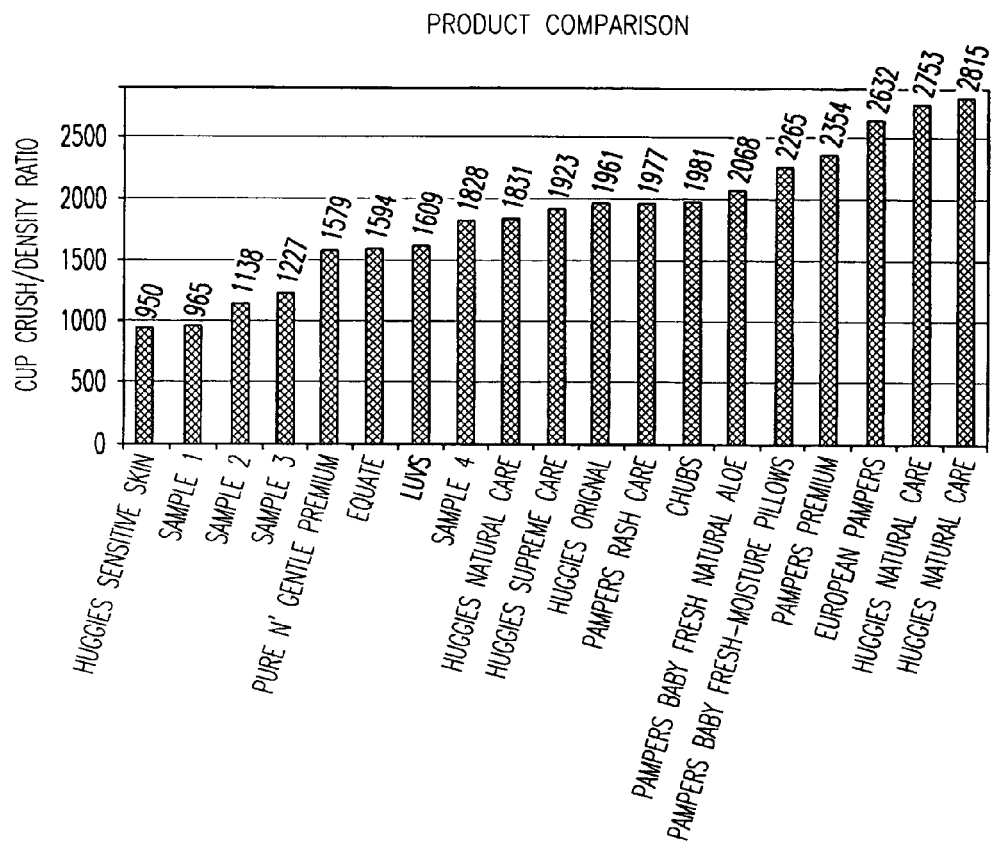
FIG. 8 is a chart of cup crush to density ratio of several commercially available wet-wipes and the cup crush of the wet-wipes of the present invention.
Figure 9:
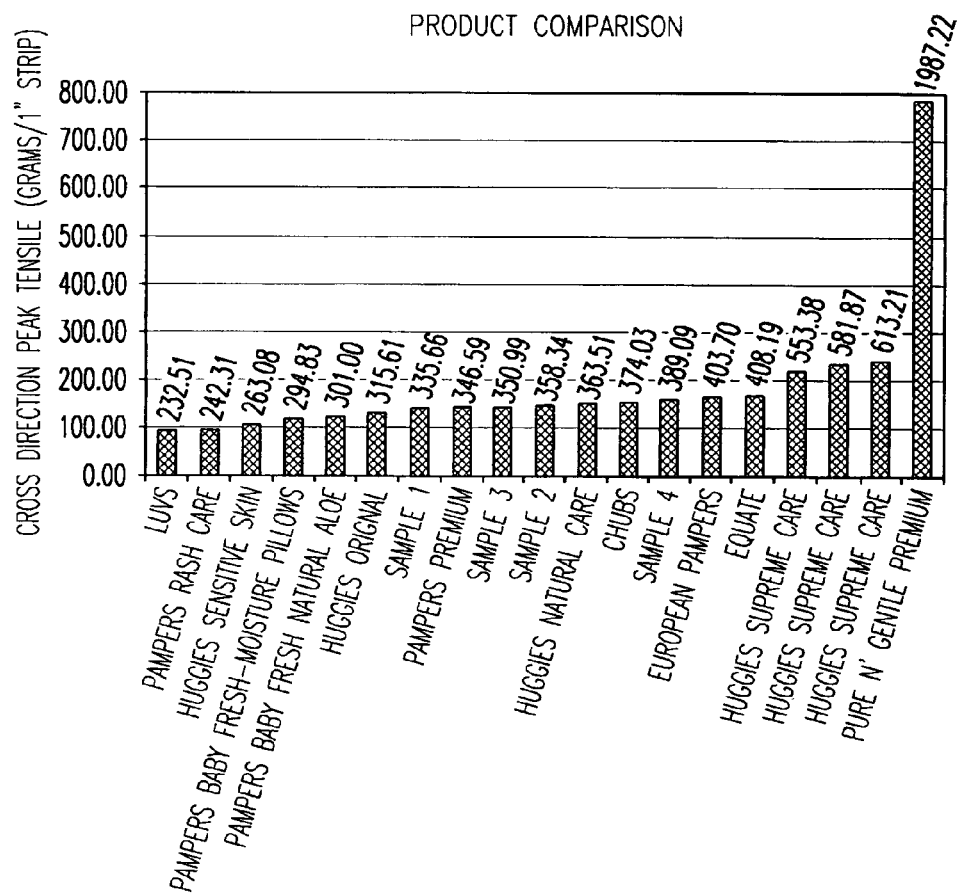
FIG. 9 is a chart of CD tensile strength of several commercially available wet-wipes and the CD tensile strength wet-wipes of the present invention.

The cup crush, density, thickness, tensile strength, bulk and basis weight for the wet-wipes were determined. The results are summarized in Table II. The wet density of several commercially available wet-wipes and the wet density of the wet-wipes of the present invention are compared in FIG. 6. The cup crush of several commercially available wet-wipes and the cup crush of the wet-wipes of the present invention are compared in FIG. 7. The cup crush to density ratio of several commercially available wet-wipes and the cup crush to density ratio of the wet-wipes of the present invention are compared in FIG. 8. The CD tensile strength of several commercially available wet-wipes and the CD tensile strength of the wet-wipes of the present invention are compared in FIG. 9.

TABLE 1

| Product | Product Obtained from retail stores |
|---|---|
| Sample 1 | Nov-97 |
| Sample 2 | Nov-97 |
| Sample 3 | Nov-99 |
| Huggies Sensitive Skin | Sep-96 |
| Sample 4 | Jan-00 |
| Luvs | 1QTR'99 |
| Huggies Supreme Care | Jan-00 |
| Pure N' Gentle Premium | Dec-99 |
| Huggies Supreme Care | Nov-99 |
| Huggies Natural Care | 1QTR'99 |
| Pamper Rash Care | 1QTR'99 |
| Equate | 1QTR'99 |
| Huggies Supreme Care | 1QTR'99 |
| Pampers Baby Fresh Natural Aloe | 1QTR'99 |
| Huggies Original | 1QTR'99 |
| Pampers Baby Fresh -Moisture Pillows | 1QTR'99 |
| Pampers Premium | 1QTR'99 |

TABLE 1-continued

| Product | Product Obtained from retail stores |
|---|---|
| European Pampers | Sep-96 |
| Chubs | 1QTR'99 | inner cover 1303. The removable inner cover contains a pop-up style wet-wipe dispenser including a rigid port 1305 which surrounds a flexible, rubber-like material or sheet 1306 having a dispensing opening 1307. The dispensing opening 1307 is illustrated as several slits through which individual wet wipes are removed from the container. It will be understood that the opening can have other configurations, such as a polygon, oval, circle, etc, which provide the yieldable resis-

TABLE 2

Title: Wipe With Improved Clothlike Properties

| Attribute Product | Basis Wt g/m$^2$ | Wet Bulk mm | Cup Crush g*cm | Absorption Capacity gram/gram | CD Peak gram/cm | CD TEA N*m/cm$^2$ | MD Peak gram/cm | MD TEA N*m/cm$^2$ | Density Density (g/cm$^3$) | Cup Crush/ Density Cup Crush/Density |
|---|---|---|---|---|---|---|---|---|---|---|
| Sample 1 | 82 | 1.14 | 69.2 | 6.88 | 132.15 | *** | 233.94 | *** | 0.072 | 965 |
| Sample 2 | 82 | 1.07 | 87.5 | 5.87 | 141.08 | *** | 364.30 | *** | 0.077 | 1138 |
| Sample 3 | 86 | 1.15 | 92 | 6.12 | 138.18 | 30.448 | 320.83 | 71.201 | 0.075 | 1227 |
| Sensitive Skin | 84 | 0.75 | 106.2 | 8.99 | 103.58 | *** | 196.44 | *** | 0.112 | 950 |
| Sample 4 | 85 | 1.35 | 115 | 5.74 | 153.18 | 34.813 | 388.94 | 77.323 | 0.063 | 1828 |
| Luvs | 57 | 0.76 | 122.4 | 8.99 | 91.54 | 7.860 | 167.11 | 6.702 | 0.076 | 1609 |
| 82229 Suprem Care | 78 | 1.08 | 139 | 8.88 | 217.87 | 40.411 | 487.52 | 53.269 | 0.072 | 1923 |
| Pure N' Gentle Premium | 66 | 0.70 | 150.1 | 7.18 | 782.37 | 56.876 | 788.05 | 22.839 | 0.095 | 1579 |
| 7366 Supreme Care | 77 | 1.30 | 163.7 | 7.77 | 229.08 | 44.352 | 487.77 | 59.042 | 0.059 | 2753 |
| Natural Care-prince | 75 | 0.83 | 165.7 | 10.38 | 143.11 | 25.142 | 309.69 | 28.127 | 0.090 | 1831 |
| Pamper Rash Care | 62 | 0.73 | 168.7 | 7.51 | 95.40 | 6.922 | 180.36 | 7.316 | 0.085 | 1977 |
| Equate | 62 | 0.57 | 174.6 | 6.53 | 160.70 | 12.141 | 322.35 | 15.027 | 0.110 | 1594 |
| Supreme Care | 80 | 1.25 | 180.9 | 8.41 | 241.42 | 43.747 | 426.89 | 47.978 | 0.064 | 2815 |
| Baby Fresh Natural Aloe | 64 | 0.71 | 188.6 | 6.97 | 118.50 | 8.037 | 193.58 | 7.881 | 0.091 | 2068 |
| Original | 79 | 0.78 | 198.6 | 8.57 | 124.26 | 21.353 | 331.80 | 22.357 | 0.101 | 1961 |
| Baby Fresh -Moisture Pillows | 64 | 0.73 | 199 | 7.03 | 116.08 | *** | 205.37 | *** | 0.088 | 2265 |
| Pampers Premium | 69 | 0.72 | 226.2 | 7.49 | 136.45 | 9.172 | 247.69 | 9.588 | 0.096 | 2354 |
| Euro Pampers | 82 | 0.84 | 255.7 | 9.24 | 158.94 | *** | 405.37 | *** | 0.097 | 2632 |
| Chubs | 65 | 0.51 | 256.3 | 3.41 | 147.2560 | 8.492462 | 486.6270 | 16.87733 | 0.129 | 1981 |

*** Not Measured

Figure 10:
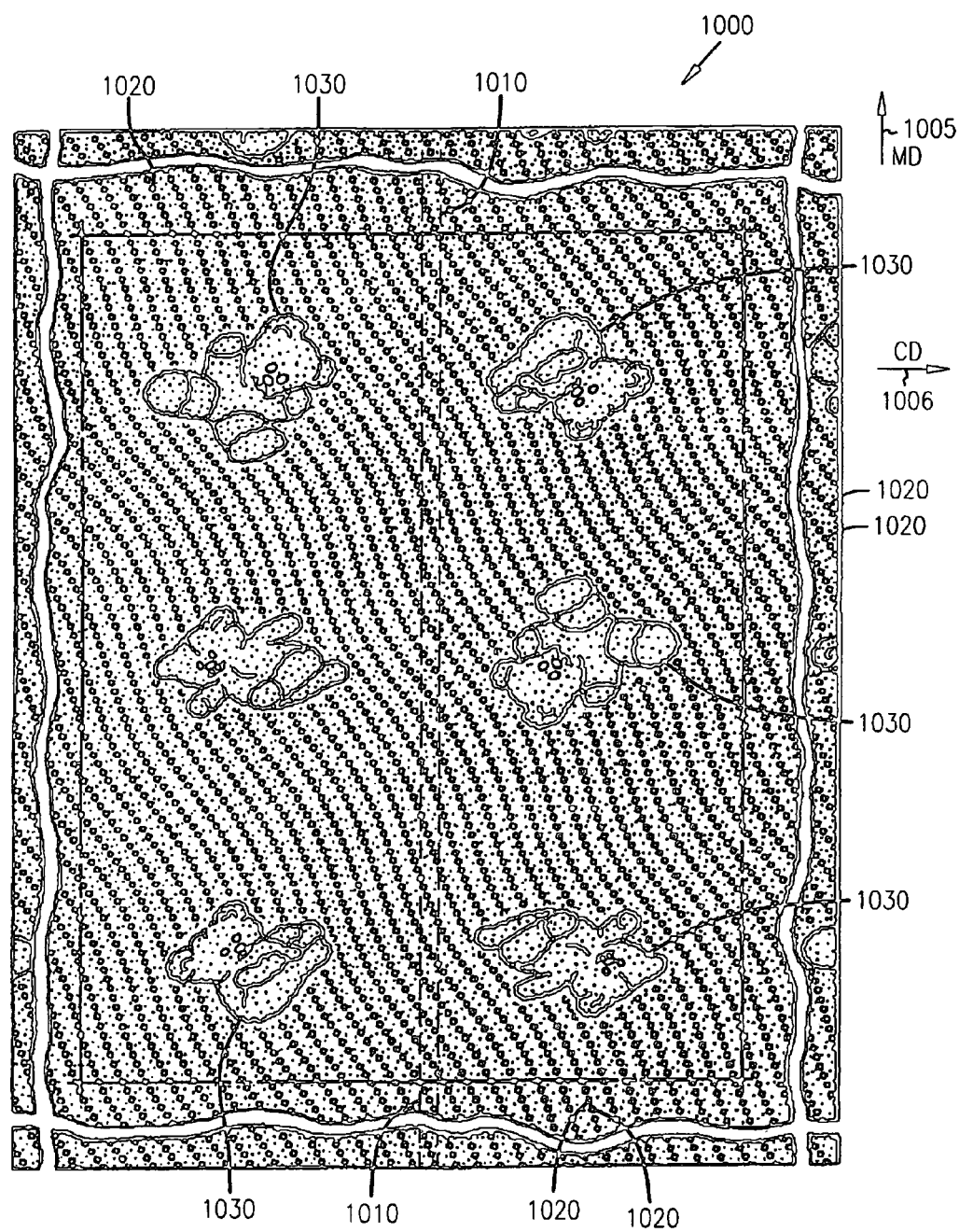
FIG. 10 is a representative plan view of an bonding pattern suitable for bonding the layers of the composite elastic material.

FIG. 10 shows a plan view of a wet-wipe 1000 created according to the processes described herein. As discussed above, elastic fibers 1010, schematically depicted in FIG. 10 as dashed lines, extend in the machine direction (MD). Wet-wipe 1000 includes a plurality of bonding points 1020 arranged in non-linear waves which are not orthogonal to the either the machine direction (MD) indicated by arrow 1005 or the cross direction (CD) indicated by arrow 1006. For clarity of illustration, only a few bonding points 1020 are labeled with reference numerals. The bonding points 1020 are created by the bonding roller arrangement 20, 22 as the elastic layer 12 and gatherable layer 24 and\or 28 pass through the bonding roller arrangement. The wet-wipe 1000 further has decorative outlines, here shown as various forms of teddy bears, forming additional bonding areas 1030 joining at least one gatherable layer 24 or 28 to elastic layer 12. The calender roller 20, in one embodiment, includes a plurality of pins corresponding to each bonding point 1020 and bosses corresponding to outlines forming bonding areas 1030. While the illustrated embodiment has numerous bonding points 1020 and bonding areas 1030, it is understood that one embodiment requires fewer bonding points than illustrated in FIG. 10, such as only two bonding points 1020 or bonding areas 1030. Further, wet-wipe 1000 does not require both bonding points 1020 and bonding areas 1030. For example, only a plurality of bonding points 1020 join the gatherable layer 24 to elastic layer 12. That is, the wet-wipe does not have bonding areas 1030. In another embodiment, only a plurality of bonding areas 1030 are provided.

Figure 13:
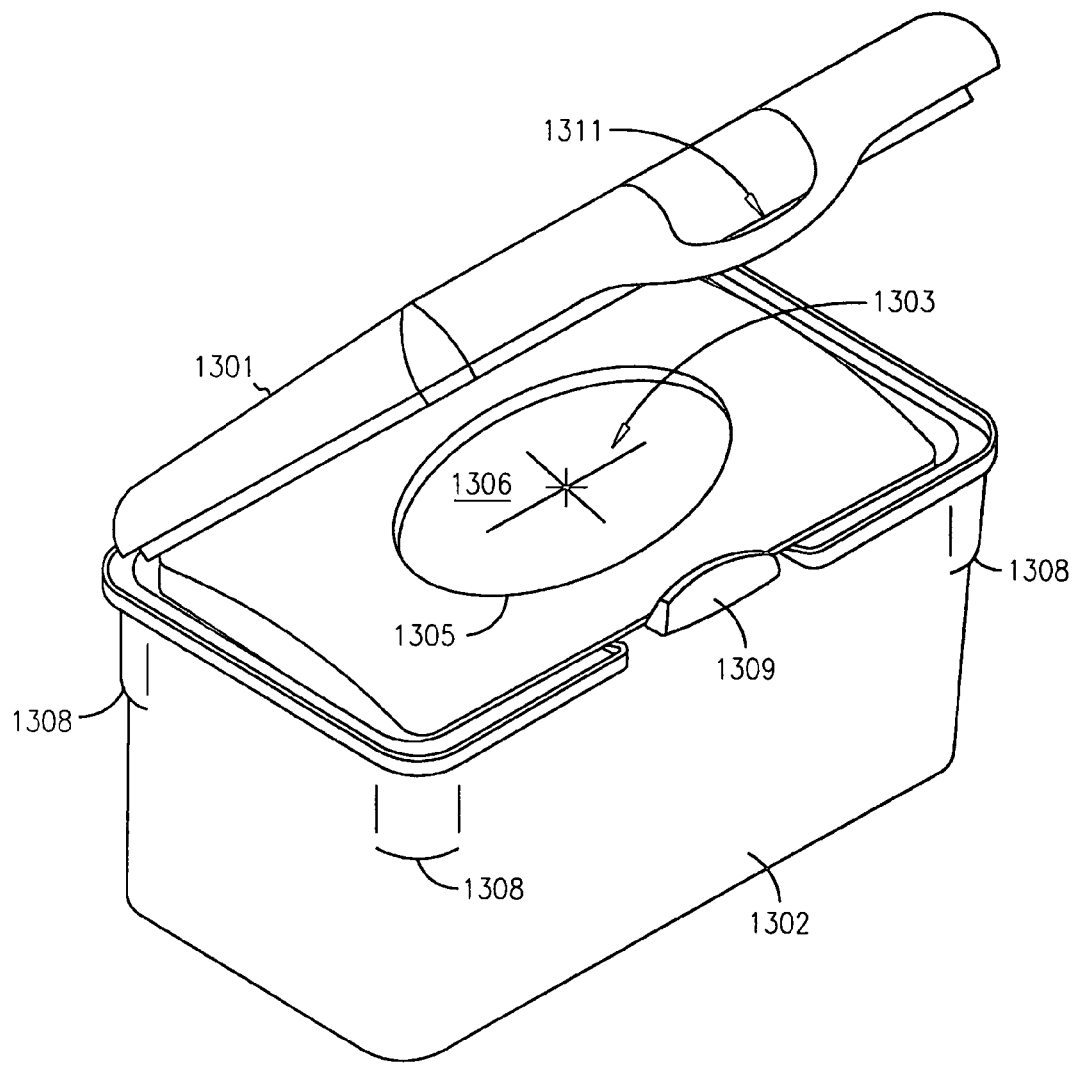
FIG. 13 is a perspective view of one embodiment of a wet-wipe container with the lid open, illustrating the placement of the dispenser within a removable inner cover.

FIG. 13 shows a rigid plastic wet-wipe container having a lid 1301 hingedly attached to a base 1302 and a removable tance required to stretch the wet-wipe to increase its thickness as it is removed from the container. The removable inner cover shown is somewhat dome-shaped with a slight pitch toward the front of the container. The cover is removably secured to the sidewalls of the base by a small lip around the periphery of the inner cover that engages with notches within several protruding ribs on the inner surface of the sidewalls (not shown). It also rests on a small support surface in each of the four corners of the base, which is outwardly visible by discontinuities 1308 in the rounded corners of the base. The lid is secured in a closed position by a suitable latching mechanism, in which a protrusion 1309 in the front lip of the base is engaged by an opening 1311 in the front lip of the lid.

The shape of the rigid port in the embodiment shown in FIG. 13 is oval, but can be any shape and size large enough to enable the user to reach into the container with their fingers to grasp the next available wet wipe in the event of a dispensing failure. Other suitable shapes include, without limitation, polygons, such as square, rectangular, and triangular; circular and irregular. The area of the oval illustrated in the container of FIG. 13 is about 6 square inches.

Dispensing opening 1307 includes slits in the flexible, rubber-like sheet, which, as shown, are star-shaped and cross essentially at one point on the sheet. The longest slit is about 1.75 inches and the smaller slits are about 0.25 inch. However, many other slit configurations are also suitable including, without limitation, X-shaped slits, straight slits and curvilinear slits. The length of the individual slits can be about 0.25 inch to about 3 inches, more specifically from about 0.25 inch to about 2 inches. The length of the slits will in part depend upon the slit configuration and the number of slits. The sum total length for all of the slits in the sheet or material can be about 2.5 inches or greater. It is preferred to have at least one slit with a length of about 1 inch which, in combination with the elasticity of the rubber-like sheet or material, will allow the user to reach into the container with at least two fingers as necessary. For very tall containers, it may be necessary to lengthen at least one of the slits so that the user can still reach the bottom of the container. For such a container, at least one of the slits may need to be between 2 and 6 inches in length, more specifically between 3 and 4 inches in length. This will allow the user to insert one or more fingers as well as part of the hand into the container to retrieve a wipe.

Figure 14:
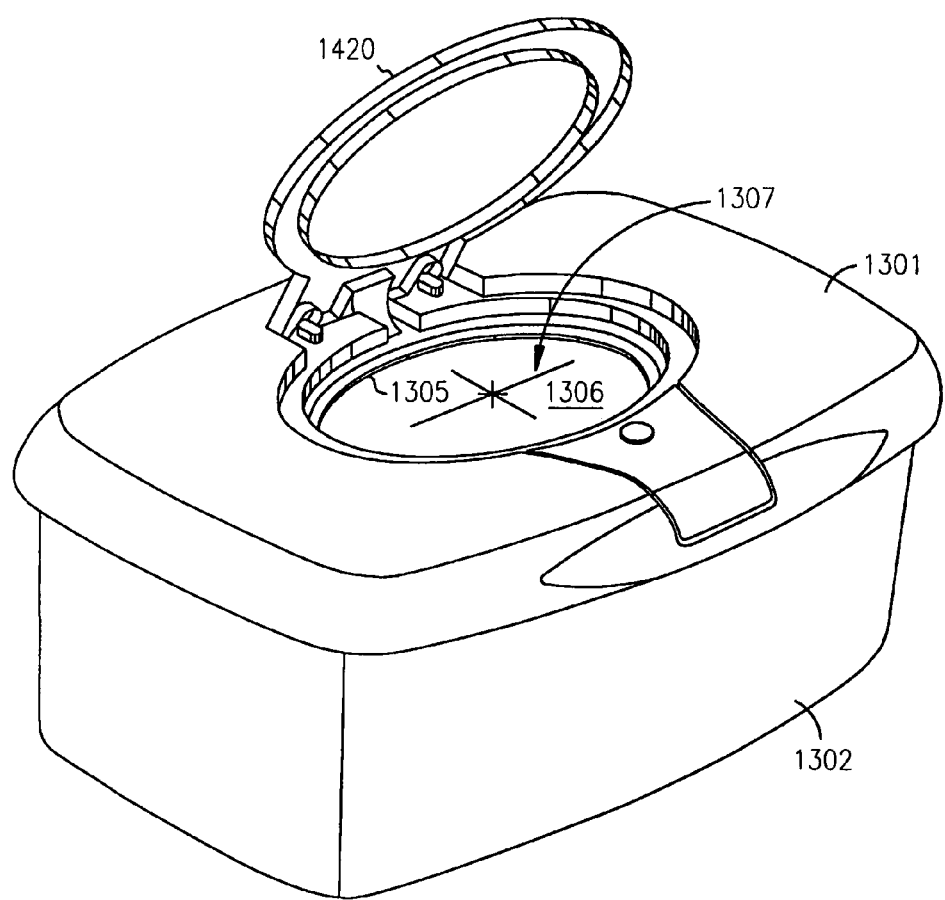
FIG. 14 is a perspective view of another embodiment of a wet-wipe container, with the lid open, wherein a wet-wipe dispenser is recessed within the rigid top of the container.

FIG. 14 is a perspective view of another rigid plastic container in accordance with this invention, in which the pop-up style dispenser is recessed within the lid of the container. Elements which are similar to those described above are designated by the same reference numbers. Shown is a removable lid 1301, a base 1302, a rigid port 1305 which surrounds a flexible, rubber-like sheet 1306 having a dispensing opening 1307 through which the wet wipes are dispensed. This container also has a pop-up lid 1420 which can be closed to seal the container when not in use.

Figure 15:
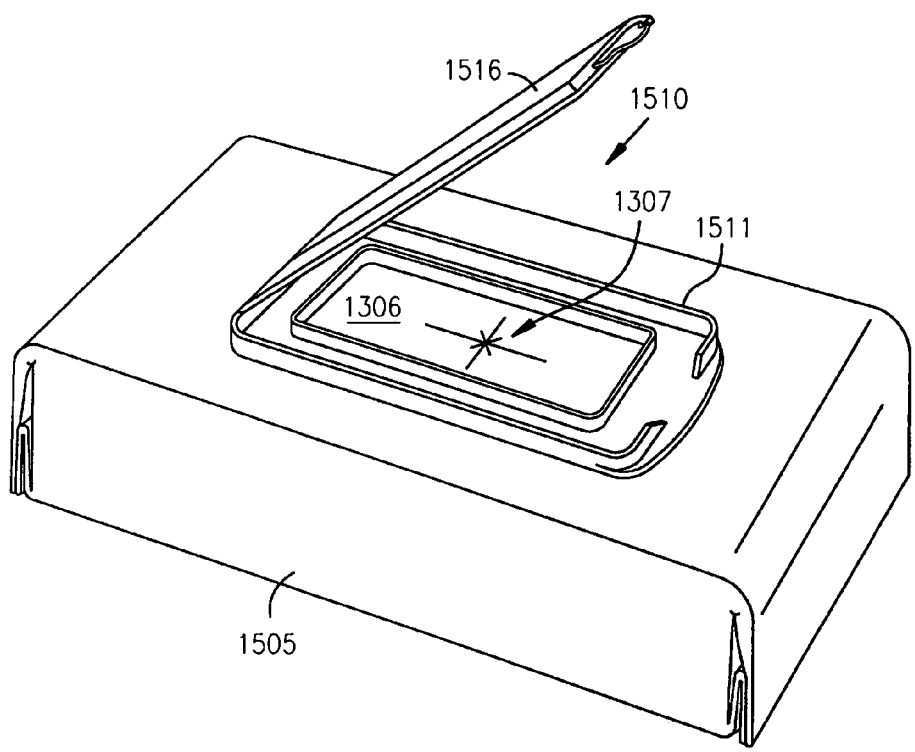
FIG. 15 is a perspective view of another embodiment of a wet-wipe container, wherein a wet-wipe dispenser is attached to a flexible container package.

FIG. 15 shows another container, in which the container is a flexible package 1505, such as a plastic film-wrapped package, having a flip-top style dispensing opening structure. The flexible plastic film package 1505 contains a stack of wet-wipes. A dispenser 1510 is provided on the top of the package, which dispenser includes a rigid port 1511 surrounding a flexible, rubber-like sheet 1306 having dispensing opening 1307, for example formed of one or more slits, through which the wet wipes are removed from the package 1505. The flip-top lid 1516 can be closed over the rigid port to seal off the container when not being used. Any suitable closure design can be used to effect a proper seal.

While the dispenser useful for purposes of this invention has been specifically illustrated in three different styles of container, those skilled in the art will appreciate that many different container designs are possible, including canister style containers, without departing from the scope of the invention.

The flexible, rubber-like sheet 1306 forms dispensing opening 1307, wherein the dispensing opening has a Penetration Index of from about 50 to about 600 grams. More specifically, the Shore A hardness (as measured by ASTM D2240) of the flexible, rubber-like sheet or material 1306 is about 100 or less, more specifically from about 20 to about 70, and still more specifically from about 30 to about 60. The Gurley stiffness of the flexible, rubber-like sheet or material (as measured by ASTM D 6125-97 "Standard Test Method for Bending Resistance of Paper and Paperboard") is about 10,000 milligrams of force (mgf) or less, more specifically from about 100 to about 8000 mgf, more specifically from about 200 to about 6500 mgf, and still more specifically from about 300 to about 1500 mgf. The thickness of the flexible, rubber-like sheet 1306 is about 0.1 millimeter or greater, more specifically from about 0.1 to about 2 millimeters, and still more specifically from about 0.8 to about 1.5 millimeters.

The elasticity of the flexible rubber-like material or sheet 1306, as characterized by the tensile stress at 100 percent elongation and measured in accordance with ASTM D412 "Standard Test Methods for Vulcanized Rubber and Thermoplastic Elastomers", is about 10 megapascals (Mpa) or less, more specifically from about 0.1 to about 7 Mpa, and still more specifically from about 0.5 to about 2.5 Mpa.

Alternatively, the performance of the dispensing opening can be measured more directly by using a tensile testing machine to insert a ball-shaped probe into the dispensing opening under controlled conditions and measuring the force required to overcome the resistance of the opening. This simulates the use of a person's finger to reach into the container to retrieve a wipe. In general, the measurement involves placing a container to be tested underneath a specially-designed probe which is mounted to a tensile tester. The tensile tester lowers the probe into the center of the container's dispensing opening at a predetermined speed and measures the peak load, in grams, required to penetrate the opening. This test, as more specifically described below, results in a value referred to herein as the "Penetration Index". The containers of this invention have a Penetration Index of from about 50 to about 600 grams, more specifically from about 100 to about 500 grams, and still more specifically from about 200 to about 400 grams.

On example of the tensile tester is a MTS Sintech 1/G with a MTS 10 pound load cell. The software is Testworks for Windows 3.10. The load cell contains a 0.5 inch grip adapter for receiving the metal ball probe. The ball probe used is approximately 4.5 inches long. The bottom portion of the probe, which contacts the sample to be tested, is ball-shaped and has a ball diameter of 0.75 inch. The middle portion of the probe consists of a connecting "neck" which is approximately 0.375 inches in diameter and 1.375 inches long. The upper section of the probe is approximately 0.5 inch in diameter and 2.4 inches long. The end of the upper section contains a flat area to allow the probe to fit into the grip adapter of the tensile tester. The flat area is 0.125 inch off of the center of the probe. When conducting the test, the container to be tested is securely placed on a suitable surface such that the center of the dispensing opening is placed directly underneath the ball probe. The probe is initially positioned such that it is approximately one inch above the dispensing opening. Upon the start of the test, the probe moves downward at a rate of 80 inches per minute for a distance of 2 inches. The probe is held for one second at this bottom position and then is moved upward to its initial position at the same rate. The test is repeated two additional times. The peak load readings from the tensile tester, expressed as grams of force, are averaged and the result is the Penetration Index for the sample.

Figure 16A:
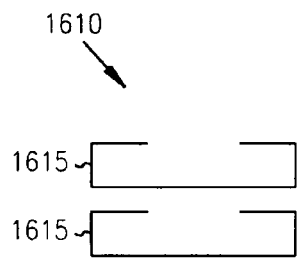
FIGS. 16A and 16B are schematic views of non-interleaved stacks of the composite elastic material.
Figure 16B:
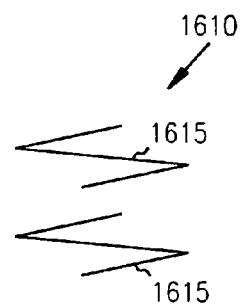

FIGS. 16A and 16B schematically show stacks of wet-wipes 1610 as may be stored in the containers illustrated in FIGS. 13-15. The stacks 1610 include a plurality of individual wet-wipes 1615 stacked one on top of each other in a non-interleaved configuration. Each wipe is folded onto itself with no portion of another wipe being positioned between the folds of the adjacent wipe(s).

Figure 17A:
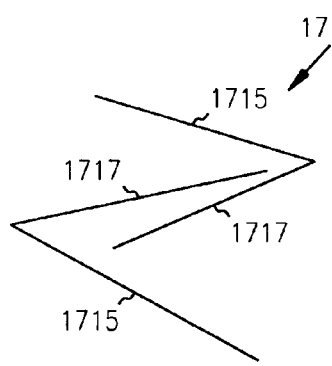
FIGS. 17A and 17B are schematic views of interleaved stacks of the composite elastic material.
Figure 17B:
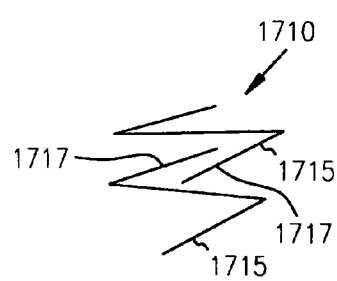

FIGS. 17A and 17B schematically show stacks of wet-wipes 1710 as may be stored in the containers illustrated in FIGS. 13-15. The stacks 1710 include a plurality of individual wet-wipes 1715 stacked one on top of each other in an interleaved configuration. Each wipe 1715 includes a portion 1717 positioned between, in a sandwich-like configuration, portions of adjacent wipe(s).

Figure 18:
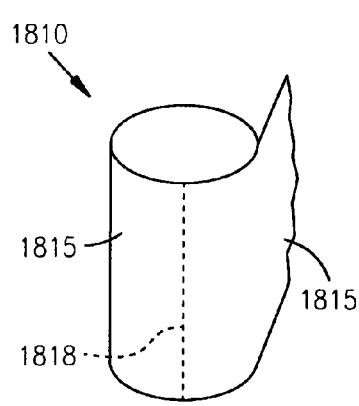
FIG. 18 is a schematic view of a roll of wet-wipes according to the present invention.

FIG. 18 shows a plurality of wet-wipes 1815 held in a roll 1810. Individual wet-wipes 1815 are separated from the adjacent wet-wipe(s) by perforation(s) 1818, which allows the wet-wipe 1815 (show on the right in FIG. 18) to be removed from the roll 1810 by tearing along the perforation between wet-wipe 1815 and the adjacent wet-wipe. A roll 1810 of wet-wipes may be stored in a container adapted to support the roll and allow removal on the wet-wipes. It is within the scope of the present invention to provide such a container with a dispenser 1307 as discussed above so that the wet-wipe removed from the container is suitable stretched and relaxed to increase the thickness of the wipe. While FIG. 18 shows the wipe being removed from the outer diameter of roll 1810, it is further understood that it is within the scope of the present invention to remove wipes from the inner diameter of the roll.

While one of ordinary skill would understand how to operate the wet-wipe, with or without the container, in order to increase its thickness and, hence, improve its cloth-like feel and softness, a description of its operation is provided for completeness. Wet-wipes lose some of their thickness during manufacturing, packaging, and distribution. It is desired to recapture the thickness prior to wet-wipe use. In one embodiment, wet-wipe 1000 is held by the top and bottom as shown in FIG. 10, and stretched in the machine direction. In the case of a wet-wipe 1000 having a machine direction length of about 190 mm in a relaxed state or mode, it is stretched to a length of about 271 mm in a stretched state or mode. The wet-wipe is released and recovers to about its relaxed state. During the stretching and recovering functions, the gathered layers 24 and 28 are stretched and then pulled back to about their original state by elastic layer 12 through bonding points. This causes the gathered layers 24 and 28 to increase in thickness, and hence, softness is improved. The increasing of the thickness of gathered layers 24 and 28 decreases the density of the wet-wipe and adds to the increased "softness" of the wet-wipe.

In another embodiment, the wet-wipe is stretched as it is pulled through dispensing opening 1307 (FIGS. 13-15). A user reaches through opening 1307 and grips and end of the wet-wipe 1000 stored within the interior of container 1302 or 1505. Alternatively, a portion of wet-wipe 1000 extends a small extent outside of the container to aid in its removal. The wet-wipes 1000 are arranged in the container such that the act of removal is in the machine direction. The wet-wipes may be stored in stacks, interleaved or non-interleaved, or in rolls. As the wet-wipe 1000 is removed, the opening 1307 yieldably resists the removal of the wet-wipe. This causes the wet-wipe to stretch when it is in the opening 1307, i.e. the wet-wipe is in its stretched mode. When the wet-wipe snaps free of dispensing opening 1307, the wet-wipe returns to about its relaxed length by action of the elastic layer. However, the mode is now different because the gatherable layers 24 and/or 28 have an increased thickness.

It is believed that the stretching of the wet-wipe should be in a range of about 5% to about 50% of its relaxed state. For example, if the wet-wipe has a length of 200 mm, then its stretched length should be in the range of about 210 mm to about 300 mm. In another embodiment, the stretching range is in the range of about 10% to about 30%. Using the same example wet-wipe having a length of 200 mm, then the wet-wipe of this embodiment has a stretched length of about 220 mm to about 260 mm.

Accordingly, the present wet-wipe dispensing system provides a wet-wipe for use having improved texture and softness. The system includes wet-wipe container 1302 or 1505 and at least one wet-wipe 1000 stored within the container. The wet-wipe is removed from the container for use. The wet-wipe 1000 has a non-woven laminate 40 of an elastic layer 12 and at least one gathered layer 24 or 28. The gathered layer 24 or 28 is bonded to elastic layer 12 at at least two points and is gathered between the at least two points. The non-woven laminate 40 has a first thickness within the container and a second thickness outside the container, the second thickness being greater than the first thickness, which helps improve the softness and cloth-like texture.

Figure 19:
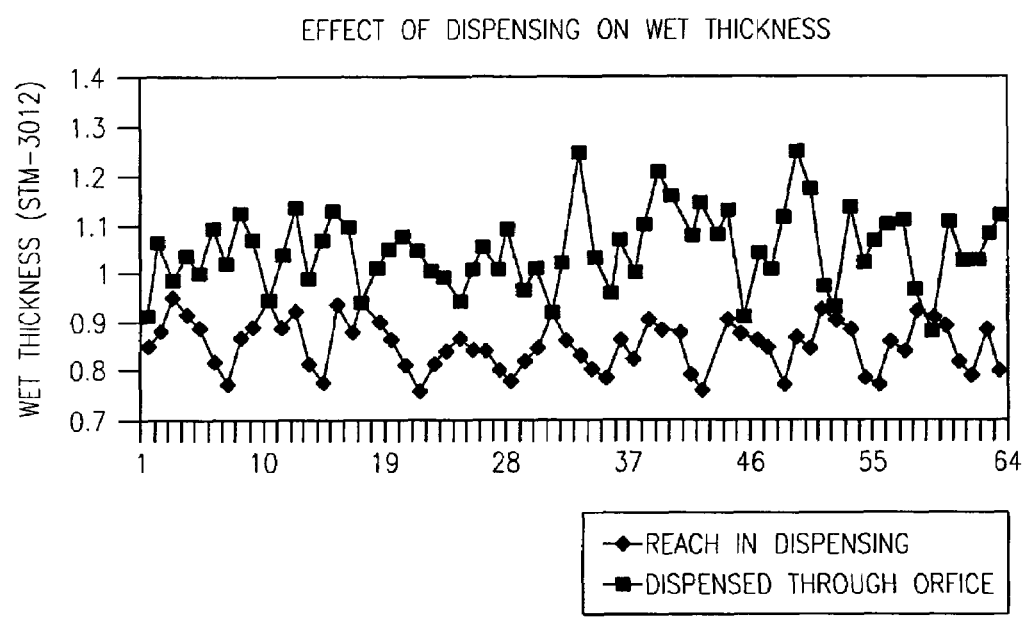
FIG. 19 is a graph of the effect of dispensing wet-wipes according to the present invention.

FIG. 19 is a graph of test data comparing wet-wipes 1000 which were removed from the container 1302 or 1505 though an open lid ("reach-in dispensing") with wet-wipes 1000 which were removed though a dispensing opening 1307 ("dispensed through orifice"). The wet-wipes used in this comparison were formed according to a stretch bonded laminate manufacturing process, and have an inner elastic layer and two non-elastic layers bonded to the elastic layer. Prior to bonding the non-elastic layers to the elastic layer, the elastic layer is stretched. After bonding the non-elastic layers to the elastic layer, the tensioning force is removed from the elastic layer which now attempts to recover its unstretched or relaxed state. When the elastic layer recovers (unstretches), the non-elastic layers are gathered. Resulting in a wet-wipe which is textured, soft, and has a high z-directional thickness. The z-directional thickness being measured generally perpendicular to the x-y plane illustrated in FIG. 10; that is, the z-direction is generally perpendicular to the MD and CD. Subsequent processing, packaging, and distribution reduces the z-directional thickness and adversely effects the softness and texture.

In this comparison, the wet-wipes dispensed through the orifice were stretched and relaxed (recovered) as described herein. The wet-wipes removed by reach-in dispensing were not subject to the stretching and relaxing. The X-axis of FIG. 19 is the sample number for each removal method and the Y-axis is the thickness of the removed wipe. As the graph shows, the dispensed through orifice (stretched and recovered) wet-wipes have a greater thickness. Additional data with regard to this comparison test is found in Table 3.

TABLE 3

|  | Dispensed through Orifice | Dispensed by Reach-In |
|---|---|---|
| Samples | N = 64 | N = 64 |
| Mean Thickness | 1.0459 mm | 0.8509 mm |
| Standard Deviation | 0.0729 mm | 0.0509 mm |
| Maximum Thickness | 1.24 mm | 0.95 mm |
| Minimum Thickness | 0.90 mm | 0.76 mm |

The each wet-wipe removal type includes 64 samples of wet-wipes. The mean thickness of the wet-wipes that were stretched is 0.195 mm (about 18%) greater than the wet-wipes which were not stretched. The maximum thickness of the stretched wet-wipes is 0.29 mm (about 23%) greater than the non-stretched wet-wipes. The minimum thickness of the stretched wet-wipes is 0.14 mm (about 15%) greater than non-stretched wet-wipes. Moreover, the thickest non-stretched wet-wipe (0.90 mm) is less than the thinnest stretched wet-wipe (0.95 mm). The greater thickness of the stretched and recovered wet-wipes provides a softer feeling wet-wipe, which is desired by the consumers of wet-wipes.

All publications, patents, and patent documents cited in the specification are incorporated by reference herein, as though individually incorporated by reference. In the case of any inconsistencies, the present disclosure, including any definitions herein will prevail.

The invention has been described with reference to various specific and preferred embodiments and techniques. However, it should be understood that many variations and modifications may be made while remaining within the spirit and scope of the invention which is defined according to the claims appended hereto.

What is claimed is:

1. A system comprising:
 a dispenser;
 a plurality of wipes, each wipe being formed of a stretch-bonded laminate that includes a non-woven elastic layer bonded to a non-woven gatherable layer, the non-woven elastic layer including a layer of elastomeric meltblown fibers and a layer of substantially parallel elastomeric fibers that are bonded to the layer of elastomeric meltblown fibers, the wipes being stored within the dispenser such that the wipes become thicker as the wipes are individually removed from the dispenser; and a liquid absorbed by the plurality of wipes.

2. The system of claim 1, wherein the dispenser engages each wipe to stretch each wipe as each wipe is removed from the dispenser.

3. The system of claim 1, wherein the layer of elastomeric meltblown fibers is formed of a different material than the layer of substantially parallel elastomeric fibers.

4. The system of claim 1, wherein at least one of the layer of elastomeric meltblown fibers and the layer of substantially parallel elastomeric fibers includes a tackifying resin that facilitates bonding between the layer of elastomeric meltblown fibers and the layer of substantially parallel elastomeric fibers.

5. The system of claim 1, wherein the dispenser includes a removable lid that may be opened to allow all of the plurality of wet wipes to be inserted into the dispenser at one time and removed from the dispenser at one time.

6. The system of claim 1, wherein the dispenser includes an opening in the removable lid such that each wipe may be removed from the dispenser through the opening with part of the lid engaging the wipe to stretch the wipe.

* * * * *